United States Patent [19]
Chalmers

[11] Patent Number: 5,640,416
[45] Date of Patent: Jun. 17, 1997

[54] DIGITAL DOWNCONVERTER/DESPREADER FOR DIRECT SEQUENCE SPREAD SPECTRUM COMMUNICATIONS SYSTEM

[75] Inventor: Harvey Chalmers, Rockville, Md.

[73] Assignee: Comsat Corporation, Bethesda, Md.

[21] Appl. No.: 478,669

[22] Filed: Jun. 7, 1995

[51] Int. Cl.$^6$ .................................................. H04B 1/707
[52] U.S. Cl. ........................... 375/206; 375/350; 375/371
[58] Field of Search ............................. 375/200, 206, 375/350, 371

[56] References Cited

U.S. PATENT DOCUMENTS

| | | |
|---|---|---|
| 4,630,283 | 12/1986 | Schiff . |
| 4,785,463 | 11/1988 | Janc et al. ........................... 375/206 |
| 4,794,341 | 12/1988 | Barton et al. ........................ 375/371 |
| 5,029,180 | 7/1991 | Cowart . |
| 5,056,106 | 10/1991 | Wang et al. . |
| 5,099,493 | 3/1992 | Zeger et al. . |
| 5,103,459 | 4/1992 | Gilhousen et al. . |
| 5,146,741 | 9/1992 | Sood . |
| 5,157,686 | 10/1992 | Omura et al. . |
| 5,161,168 | 11/1992 | Schilling . |
| 5,166,951 | 11/1992 | Schilling . |
| 5,166,952 | 11/1992 | Omurg et al. . |
| 5,185,762 | 2/1993 | Schilling . |
| 5,189,683 | 2/1993 | Cowart . |
| 5,193,102 | 3/1993 | Meidan et al. . |
| 5,208,829 | 5/1993 | Soleimani et al. . |
| 5,210,770 | 5/1993 | Rice . |
| 5,224,120 | 6/1993 | Schilling . |
| 5,224,122 | 6/1993 | Bruckert . |
| 5,228,053 | 7/1993 | Miller et al. . |
| 5,235,612 | 8/1993 | Stilwell et al. . |
| 5,253,268 | 10/1993 | Omura et al. . |
| 5,267,271 | 11/1993 | Rice . |
| 5,280,472 | 1/1994 | Gilhousen et al. . |
| 5,289,499 | 2/1994 | Weerackody . |
| 5,295,153 | 3/1994 | Gudmundson . |
| 5,457,713 | 10/1995 | Sanderford, Jr. et al. ........... 375/206 |
| 5,504,785 | 4/1996 | Becker et al. ....................... 375/350 |
| 5,566,173 | 10/1996 | Steinbrecher ........................ 370/466 |

FOREIGN PATENT DOCUMENTS 2 189 969  11/1987  United Kingdom ............... 375/200

*Primary Examiner*—Stephen Chin
*Assistant Examiner*—Jeffrey W. Gluck
*Attorney, Agent, or Firm*—Sughrue, Mion, Zinn, Macpeak & Seas

[57] ABSTRACT

A digital despreader and downconversion technique useful for spread spectrum communications receivers digitally tracks a timing phase of a PN sequence without the need for steering an external hardware clock. An additional benefit of the technique is the use of a receive filter matched to the bandlimited transmit chip sequence prior to despreading which reduces the amount of noise present after despreading. A narrowband filter also permits the use of a single A/D converter in the receiver, IF sampling at a relatively low sample rate compared to other techniques. A method for reducing a total number of computations required thereby facilitating implementation in a single custom digital integrated circuit is also described.

13 Claims, 16 Drawing Sheets

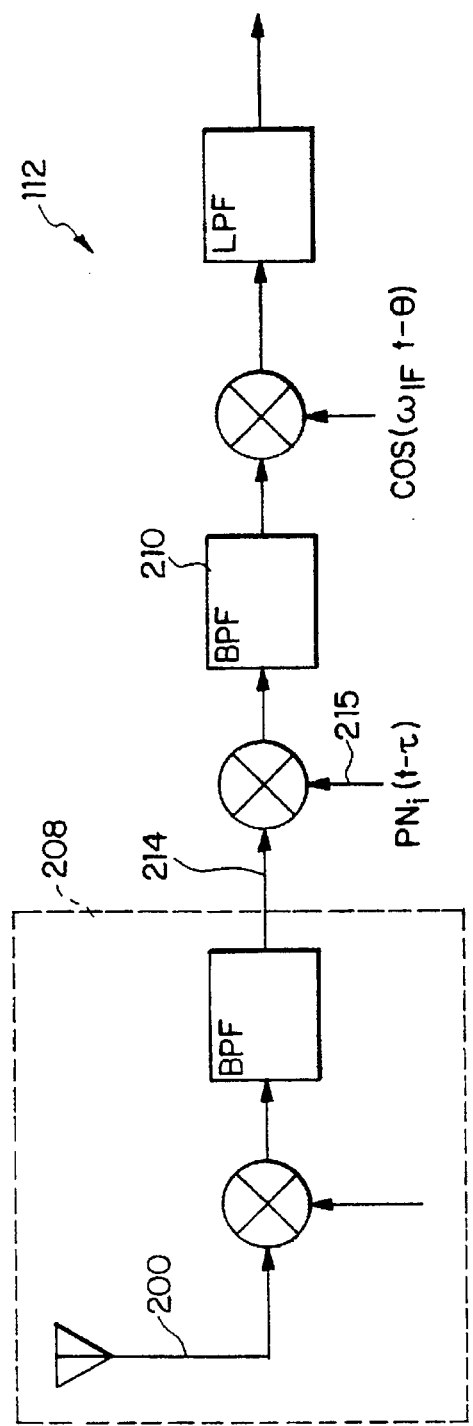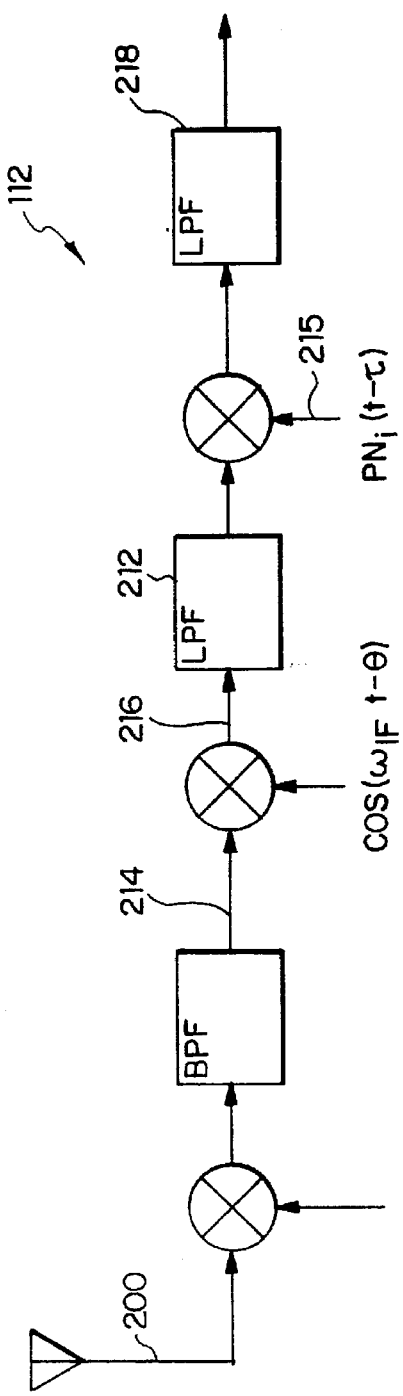
FIG. 2(b) PRIOR ART
FIG. 2(c) PRIOR ART

SLEW PHASE OF LOCAL PN SEQ. IN INCR. OF Tc/2 UNTIL ACQUISITION DET.

TIMING ERROR < Tc/2

TIMING ERROR < Tc/32

ADJUST PHASE OF RECEIVED SIGNAL 516 WITH POLYPHASE FILTER IN INCREMENTS OF Tc/32 TO MINIMIZE TIMING ERROR

DIGITAL DOWNCONVERTER/DESPREADER FOR DIRECT SEQUENCE SPREAD SPECTRUM COMMUNICATIONS SYSTEM

FIELD OF THE INVENTION

The present invention is generally directed to communications receivers of direct sequence spread spectrum signals, and in particular, to digitally sampling the spread spectrum signal at an IF frequency (approximately 200 MHz and below) and simultaneously despreading and downconverting the signal to baseband.

BACKGROUND OF THE INVENTION

A block diagram of a typical direct sequence spread spectrum system 100 is shown in FIG. 1. A transmitter 102 consists of an MPSK modulator 104 which typically utilizes either Binary (BPSK) or Quaternary (QPSK) phase shift keying, followed by a spreader 106 which multiplies the modulated signal by a digital PN (pseudonoise) spreading code 108. The PN code 108 is typically generated by a PN Code Generator 110 at a rate (referred to as the chipping rate) at least an order of magnitude faster than a data symbol rate of the modulator 104, thus spreading the spectrum across a much greater bandwidth. For a multiple user system, each user has his own unique PN code and the bandwidth can be shared among different users using code division multiple access (CDMA) techniques.

A receiver 112 generates an exact replica 109 of the transmit PN sequence and multiplies it by the received signal to despread and hence recover the original modulated waveform. The receiver 112 must incorporate some means of synchronizing the timing of the locally generated PN sequence to that of the received signal. Both code acquisition circuitry 111 and tracking circuitry 113 must be included.

The receiver 112 structure typically uses one of three general structures as shown in FIGS. 2(a), (b) and (c). In FIG. 2(a), the receiver RF input 200 is first downconverted to a wideband intermediate IF frequency signal 214 in a wideband IF stage 208. The IF bandwidth must be greater than the spread bandwidth of the transmit signal. The IF signal 214 is then despread by a PN sequence 204 which has been upconverted from baseband to the IF frequency. The resulting despread signal 206 appears at baseband and is then filtered by a narrowband lowpass filter 202 with a bandwidth on the order of the data symbol rate.

A second scheme, shown in FIG. 2(b), also downconverts the RF signal 200 in the wideband IF stage 208. The despreading operation occurs at the IF frequency, although it is accomplished by multiplying the IF signal 214 by the baseband PN sequence 215. After despreading, the signal bandwidth is reduced, and the signal can then be filtered with a narrowband IF filter 210. The narrowband signal is then downconverted to baseband in the narrowband IF stage followed by narrowband baseband filtering.

The third scheme performs despreading at baseband as shown in FIG. 2(c). The wideband RF signal 200 is downconverted to a wideband baseband signal 216 and then filtered with a wideband baseband filter 212. The baseband signal is then despread by multiplying it by the baseband PN sequence 215 followed by narrowband baseband filtering.

One disadvantage of an all analog implementation of the IF and despreading circuits is the large number of components typically required. Each IF stage requires a local oscillator, mixer and filter. The despreading mixer must remain flat over a large bandwidth and accept a high slew-rate digital PN input. If pre-filtering is employed prior to despreading to improve noise performance, it typically exhibits a non-ideal frequency and time delay response, resulting in sub-optimum performance. The narrowband filter following the despreader should be reasonably sharp, often resulting in a physically large device. The baseband version of the despreader requires a complex downconverter where the local oscillator must be split into its in-phase and quadrature components. In addition, the phase noise of the local oscillators must be tightly controlled or there will be a performance loss in the subsequent coherent MPSK demodulator. DC offsets are also a concern and should be removed prior to demodulation. Analog circuits also suffer from component drift and aging and may be difficult to obtain with very tight tolerances.

Although the PN sequence is generated using digital techniques, the remaining circuitry has often been implemented using analog techniques. The digitally modulated MPSK signal is typically not converted to digital form until after the despreading operation. However, recently there has been great interest in implementing the despreader in digital form as well. A block diagram of a prior art digital despreader 300 which performs despreading at baseband is shown in FIG. 3. The scheme accepts a wideband IF signal 214 as depicted in FIG. 2(c) and digitally samples it directly in the wideband IF stage using A/D converter 301. After sampling by the A/D converter 301, the signal 308 is downconverted to baseband by digitally multiplying it by in-phase 310 and quadrature 312 numerically controlled oscillators. The complex baseband signal is filtered with a very broad accumulate and dump filter 304 which simply averages two adjacent samples. The filtered signal is then despread with a baseband PN sequence. The steerable clock generator 302, which is controlled by an external chip timing control signal 306, outputs a sample clock 314 to the A/D converter 301. The timing phase must be accurately controlled according to the PN timing acquisition 111 and tracking 113 mechanisms following the despreader.

The prior art digitally implemented downconverter/despreader has overcome many of the disadvantages of equivalent analog circuits. Only a single A/D converter is required and sampling is performed directly in the wideband IF where DC offsets can easily be removed. However, this scheme still requires a sampling rate approximately an order of magnitude higher than the chipping rate due to the poor amplitude response of the baseband digital filter 304 following the downconverter. A disadvantage inherent to all of the prior art methods is that they each use an analog clock circuit to track the timing phase of the PN sequence. Such a circuit must be highly stable and shielded from external noise sources. It also requires a finite amount of settling timing to slew the clock to a desired timing phase value and suffers from phase jitter about the nominal value. In addition, the circuitry needed to precisely adjust the phase of the high frequency chip timing clock is often complex. Recent digital implementations of the steerable clock generator 302 utilize direct digital synthesis where a numerically controlled oscillator drives a high frequency D/A converter. This is an expensive solution.

The digital scheme as shown in FIG. 3 has a second problem with timing control. Timing synchronization is accomplished by adjusting the phase of the A/D converter sample clock prior to the downconversion operation. The IF subsampling technique employed actually creates an alias of the IF signal separated from the IF frequency by an integral multiple of the sample rate, $f_s$. However, as the sample rate is changed by the clock generator circuitry to track the PN timing, the carrier frequency and phase change by a multiple of $f_s$. This can cause excessive phase jitter in the carrier phase and requires some means of compensation.

There are many examples found in the prior art which attempt to correct the above-noted shortcomings. Cowart, in related U.S. Pat. Nos. 5,029,180, 5,189,683 and 5,146,471, represents a low-cost implementation of a direct sequence spread spectrum (hereafter referred to as DS SS) transceiver suitable for integration into a single chip. Cowart assumes that the carrier frequency, chip rate, and data symbol rate are all synchronized from a common frequency source. Cowart also requires that the actual receive frequency and the receiver reference oscillator frequency be nearly identical by deriving them from stable crystal oscillators at frequencies below 50 MHz. The primary application of Cowart is for transmission over power lines.

Cowart, however, uses hard-limiting in the receiver and only performs coarse timing tracking (within +/±¼ of a chip period) of the received PN (pseudo-noise) chipping sequence. In addition, Cowart cannot make precise chip timing adjustments and the bit error performance over noisy channels is suboptimal.

Omura et al., in U.S. Pat. No. 5,166,952, 5,157,686 and 5,253,268, discuss a DS SS receiver and transmitter which employ either pulse position modulation or multiple chip code modulation. A matched filter correlator, matched to the transmit PN codes, is described followed by non-coherent demodulation.

Although the receiver of Omura performs digital sampling of the signal prior to despreading at a sample rate which is an integral multiple of the PN chip rate, two A/D converters are required. In addition, downconversion is performed by analog means and there is no fine tracking of the received PN chip timing. The resolution of chip timing adjustments is a function of the A/D sample rate and thus an excessively high sample rate is required for high resolution adjustment. In this solution, the bit error performance over noisy channels is also sub-optimal.

Soleimani, et al., U.S. Pat. No. 5,208,829, disclose a satellite communications system for providing maximum power output in a spread spectrum signal transmission. Filter designs for both the transmitter and receiver which provide a maximally flat frequency response over the band of interest are given. A receiver structure is described which can receive either spread or non-spread signals.

The spread-spectrum receiver design of Soleimani is based on conventional techniques. The receiver performs A/D conversion prior to despreading, but two converters are required rather than one. The receiver structure performs analog downconversion to baseband prior to despreading and the PN chip timing adjustments require an external VCXO circuit. This solution requires a high number of precision components making it expensive and complex.

SUMMARY OF THE INVENTION

A scheme has been devised to digitally sample an analog direct sequence spread spectrum signal at an IF frequency (approximately 200 MHz and below), downconvert it to baseband and despread it. The scheme eliminates the need for an analog IF downconversion stage (mixer, oscillator, and filter) and also generates perfectly matched in-phase and quadrature samples required for subsequent multiple phase shift keying (MPSK) demodulation. In addition, received sample timing phase adjustments are accomplished digitally using a novel FIR filter structure, eliminating the need for analog clock steering circuitry. The technique has the unique feature of digitally tracking the timing phase of the PN sequence without the need for steering an external hardware clock. Matched filtering on the bandlimited spread waveform is also accomplished, greatly improving receiver performance. Two additional processing channels are included for timing synchronization of the receiver PN code sequence using an early/late gate synchronizer. The additional processing channels are also used during initial PN code acquisition to reduce the acquisition time by a factor of three.

The actual despreading, downconversion, and matched filtering operations have been defined in such a way that the digital processing required is greatly simplified, facilitating implementation into a single custom digital chip or several inexpensive field programmable gate arrays (FPGAs). Digital bandpass sampling techniques are employed where the signal is sampled at a rate on the order of the bandwidth of the spread spectrum signal directly at IF frequencies. However, since the sample rate is typically much higher than the data rate (because the spreading chip rate is much higher than the data rate), very few bits are required in the A/D converter. In addition, only a single A/D converter is required, compared to quadrature baseband analog downconverters which use two A/D converters. The processed, despread early, punctual, and late complex outputs are sampled at the data symbol rate and the I/Q channels have perfect phase and gain matching. They can then be further processed at this low rate using prior art techniques in a programmable digital signal processor (DSP) or similar device.

The present invention has all of the advantages inherent in a digital approach such as facilitating implementation into a single integrated circuit chip for low cost, size and power, but it also possesses several new advantages. Narrowband digital FIR filtering is employed after downconversion so that a reduced A/D sample rate of four samples per symbol is feasible. Such a filter also improves bit error performance in noisy RF links and reduces the analog anti-aliasing filter requirements. Another prime advantage is that the polyphase filter structure employed can be used to perform sample timing phase adjustments. Advantageously, the use of a digital filter reduces noise prior to despreading. Because timing phase is adjusted after downconversion, the timing phase adjustments do not severely affect the carrier phase as in the prior art method of FIG. 3. In addition, the timing phase can be set to any exact value within the resolution of the polyphase filter instantaneously without any ringing or settling time. Adjusting sample timing phase after downconversion eliminates carrier phase jitter inherent in digital systems which adjust the sample timing first.

If bandlimiting filtering of the spread spectrum signal is performed in the transmitter (i.e. square-root raised cosine) then an optimal digital matched filter can be implemented in the receiver. The filter coefficients can also be easily changed to null out known sources of interference or to adapt to changing channel conditions. Antialiasing filter requirements are relaxed due to digital filtering and the invention is readily adaptable to multiple bit rates and spread factors.

The present invention provides an apparatus for digitally downconverting and despreading an analog direct sequence spread spectrum signal, comprising: a free-running, non-steered, clock generator which outputs an A/D sample clock; the A/D sample clock having a rate which is an integral multiple of a chip rate of the spread spectrum signal; an A/D converter which receives the spread spectrum signal and the A/D sample clock and outputs a digitized signal from the spread spectrum signal; a local pseudo-noise sequence signal generator which outputs a local pseudo-noise sequence signal; a complex downconverter/polyphase filter which receives the digitized signal and the A/D sample clock and a sample timing phase control signal, simultaneously filters and downconverts the digitized signal to baseband, corrects timing phase misalignment between the digitized signal and the locally generated pseudo-noise sequence signal, and outputs a complex corrected baseband signal; an impulse response of the downconverter/polyphase filter is matched to a pulse shape of the spread spectrum signal; a demultiplexer which receives the complex corrected baseband signal from the complex downconverter/polyphase filter and separates the complex corrected baseband signal into a complex punctual signal and a complex early/late signal and outputs the complex punctual and early/late signals; the complex punctual signal consists of samples of the complex corrected baseband signal detected at chip detection points; and the complex early/late signal consists of samples of the corrected signal detected at chip transition points; an early channel processor which receives the complex early/late signal, despreads and accumulates the complex early/late signal using the locally generated pseudo-noise sequence signal and outputs a complex early timing error signal; a punctual channel processor which receives the complex punctual signal, delays the locally generated pseudo-noise sequence signal, despreads and accumulates the punctual signal using the delayed locally generated pseudo-noise sequence signal, and outputs a complex data symbol; a late channel processor which receives the complex early/late signal, further delays the locally generated pseudo-noise sequence signal, relative to the delayed locally generated pseudo-noise sequence signal, despreads and accumulates the early/late signal using the further delayed locally generated pseudo-noise sequence signal and outputs a complex late timing error signal; and a digital signal processor which receives the complex early timing error signal, the complex data symbol and the complex late timing error signal and performs coherent carrier frequency and phase tracking and MPSK demodulation on a complex data symbol and which outputs a demodulated data bit, sample timing phase control signal and filter coefficient values.

The present invention is also directed to a method of digitally downconverting and despreading an analog direct sequence spread spectrum signal, comprising the steps of: generating a free-running, non-steered, A/D sample clock; the A/D sample clock having a rate which is an integral multiple of a chip rate of the spread spectrum signal; converting the spread spectrum signal into a digitized signal using the A/D sample clock and outputting a digitized signal; generating a local pseudo-noise sequence signal; simultaneously downconverting to baseband and filtering the digitized signal with a polyphase filter, correcting timing phase misalignment between the digitized signal and the locally generated pseudo-noise sequence signal and outputting a complex corrected baseband signal; separating the complex corrected baseband signal into a complex punctual signal and a complex early/late signal; outputting the complex punctual and early/late signals; the complex punctual signal consisting of samples of the complex corrected baseband signal detected at chip detection points; and the complex early/late signal consisting of samples of the complex corrected baseband signal detected at chip transition points; despreading and accumulating the complex early/late signal using the locally generated pseudo-noise sequence signal and outputting a complex early timing error signal; delaying the locally generated pseudo-noise sequence signal, despreading and accumulating the complex punctual signal using the delayed locally generated pseudo-noise sequence signal, and outputting a complex data symbol; further delaying the locally generated pseudo-noise sequence signal, relative to the delayed locally generated pseudo-noise sequence signal, despreading and accumulating the complex early/late signal using the further delayed locally generated pseudo-noise sequence signal and outputting a complex late timing error signal; and performing coherent carrier frequency and phase tracking and MPSK demodulation on a complex data symbol and outputting a demodulated data bit, sample timing phase control signal and filter coefficient values.

The polyphase filter used in filtering can also be impulse response matched to a pulse shape of the spread spectrum signal.

BRIEF DESCRIPTION OF THE DRAWINGS

These and other attendant advantages and features of the present invention will become readily apparent upon consideration of the following detailed description of the present invention when considered in conjunction with the drawings, wherein like reference numerals used throughout the figures thereof designate like parts, and wherein:

FIGS. 2(a)–2(c) represent block diagrams of three general structures for a typical receiver;

DETAILED DESCRIPTION OF THE INVENTION

Figure 1:
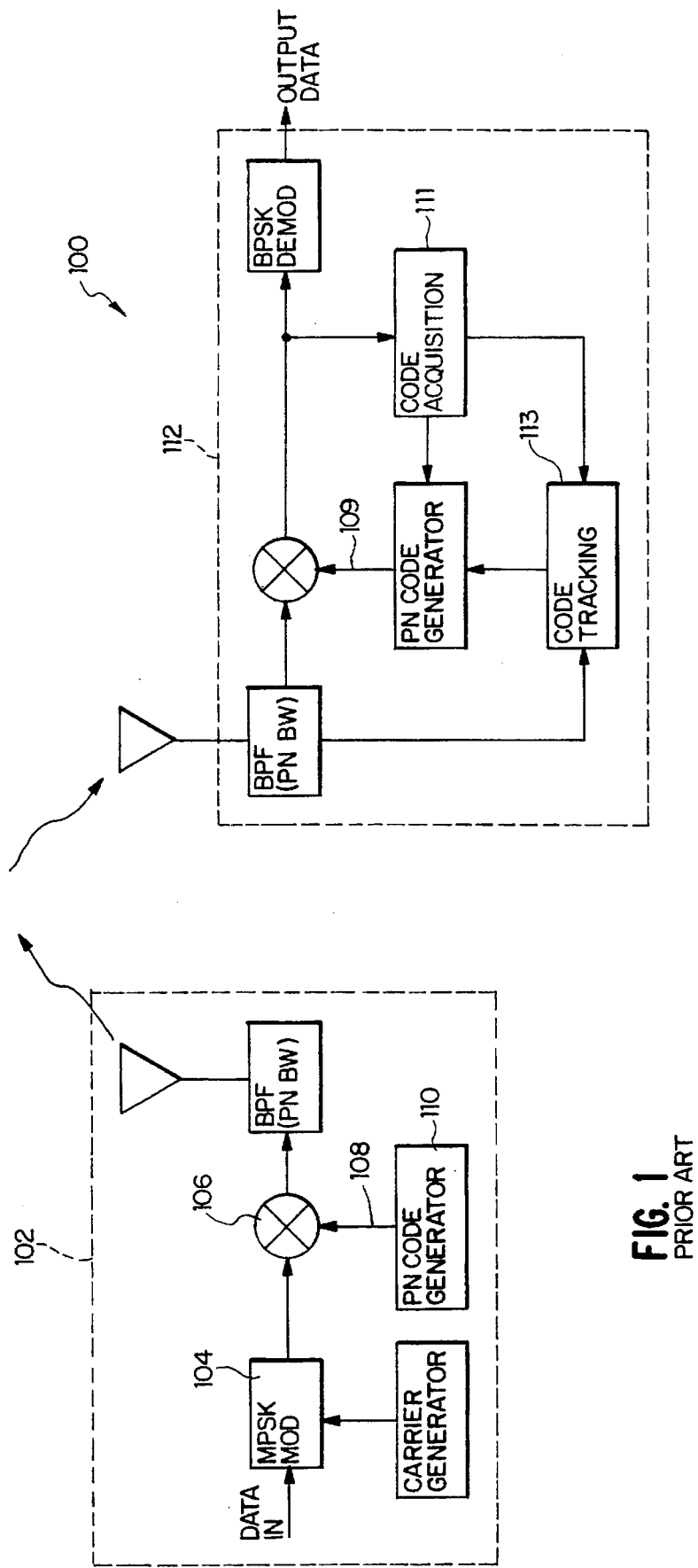
FIG. 1 is a block diagram of a typical direct sequence spread spectrum communications system.
Figure 2A:
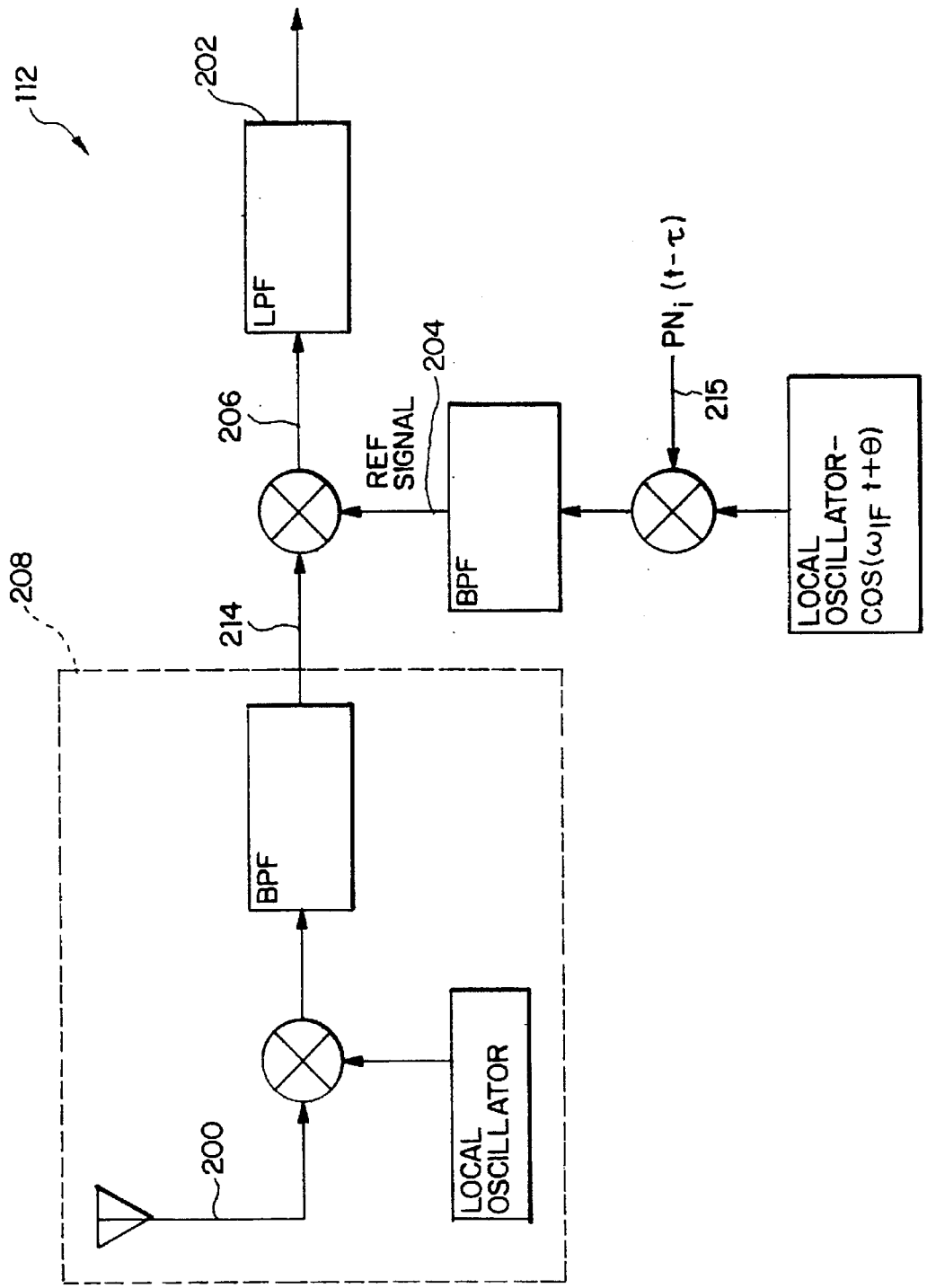
Figure 3:
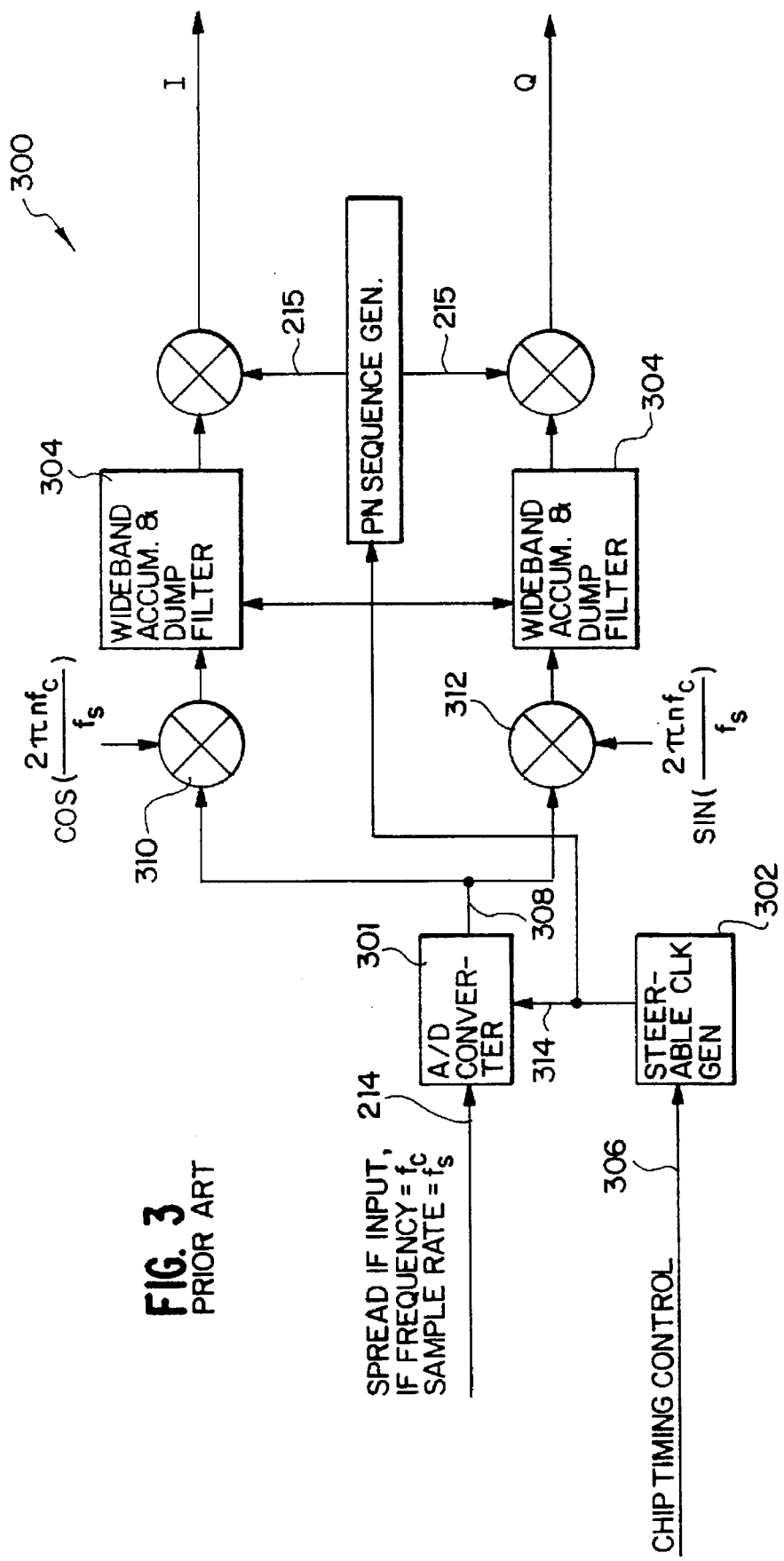
FIG. 3 is a block diagram of a prior art digital despreader.
Figure 4:
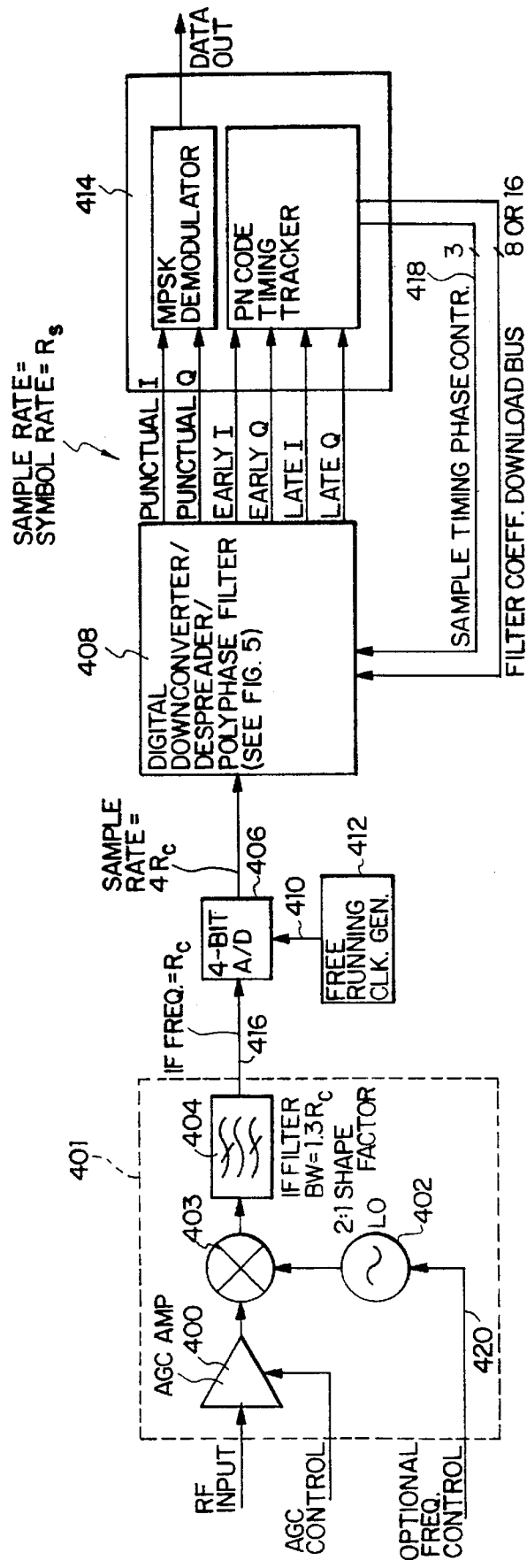
FIG. 4 is a block diagram of a spread spectrum receiver employing a technique of the present invention.

A block diagram of a spread spectrum receiver employing the invention is shown in FIG. 4. The receiver 112 utilizes the baseband despreading concept depicted in FIG. 2(c). As will be discussed in greater detail below, the receiver 400 operates with a free running clock generator 412, and simultaneously performs sample timing phase adjustments, downconversion, and matched filtering using digital downconverter/despreader/polyphase filter 408.

The RF signal 200 from the antenna is first processed in a typical RF stage 401 where it is downconverted to a wideband IF signal by a wideband downconverter 403. The wideband IF signal is adjusted to the proper level for A/D conversion using an AGC amplifier 400 either in the RF or IF stage. The AGC amplifier 400 is controlled by a signal level detector (not shown) either in the analog front-end or in the digital demodulator.

An IF local oscillator 402 may be tunable by an external frequency control signal 420 if the input signal is expected to have large frequency uncertainties. The signal loss due to a frequency uncertainty of $\Delta f$ in the matched filter following the despreader is expressed as follows:

$$\text{Signal Energy Loss} = \left( \frac{\sin(\pi \Delta f T_S)}{\pi \Delta f T_S} \right)^2, \quad (1)$$

where $T_S = 1/R_S$ = the data symbol duration.

The loss is tabulated in Table 1 below. An offset of 10% of the symbol rate corresponds to a loss of just over 0.1 dE. It is therefore recommended to employ frequency control for any offset in excess of $0.1 R_s$. The frequency control signal is assumed to be derived either within the RF stage itself or from the MPSK demodulator.

TABLE 1

Computed Signal Loss after Integrate and Dump Filtering Versus Relative Frequency Offset (as a Percentage of Symbol Rate) of Carrier

| Frequency Offset, $\Delta f T_s$ | Signal Loss |
| --- | --- |
| 0% | 0 dB |
| 1% | .0014 dB |
| 5% | 0.36 dB |
| 10% | .14 dB |
| 15% | .32 dB |
| 20% | .58 dB |
| 25% | .91 dB |
| 33% | 1.62 dB |
| 50% | 3.92 dB |

The IF signal is filtered with a wideband IF bandpass filter 404 which has a shape factor of approximately 2:1 and also functions as an antialiasing filter. The IF signal 416 is then sampled by an A/D converter 406 at a rate of four samples per chip and processed in a custom digital IC 408 using the techniques of the invention. The A/D sample clock 410 is derived from a free-running clock generator 412 which is not steered and is therefore not locked to the PN chip timing of the received signal 200. The IF signal 416 is downconverted to baseband and then lowpass filtered in the digital IC 408 by a polyphase filter having a response which is matched to that of the transmit chip pulse shape. The polyphase filter also serves to correct any timing phase misalignment between the received signal and the locally generated PN sequence. The filtered signal is then despread by early, punctual, and late despreaders, matched filtered, and decimated to the symbol rate.

The output of the downconverter/despreader IC 408 is a set of complex digital data symbols, decimated to the symbol rate. The resulting in-phase and quadrature (I and Q) symbols for all three channels are sent to a standard digital signal processor (DSP) IC 414. The DSP IC 414 performs coherent carrier frequency and phase tracking and MPSK demodulation on the punctual channel. The (I and Q) early and late symbols are processed by DSP IC 414 to obtain a sample timing phase control signal 418.

The DSP IC 414 also serves as a controller for the downconverter/despreader IC 408. Although a DSP IC 414 is assumed here, there is no technical reason why the functions of the DSP IC 414 could not also be incorporated into either the same custom digital IC as the downconverter/despreader 408 or implemented in another custom digital IC. However, the DSP IC 414 provides considerable flexibility in implementing various digital acquisition and tracking algorithms.

Figure 5A:
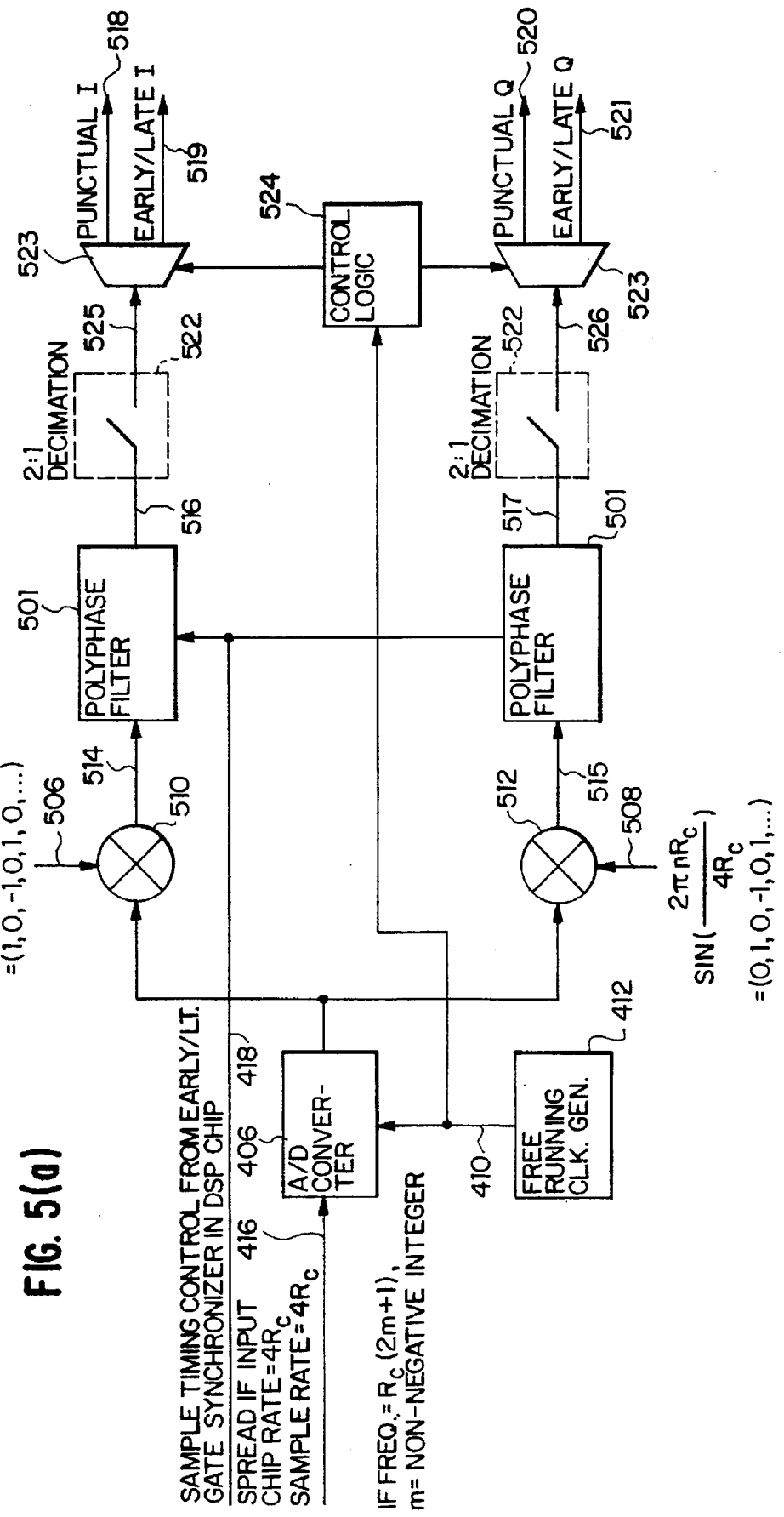
FIGS. 5(a)–5(b) are block diagrams representing the concept of the digital downconverter/despreader of the present invention.
Figure 5B:
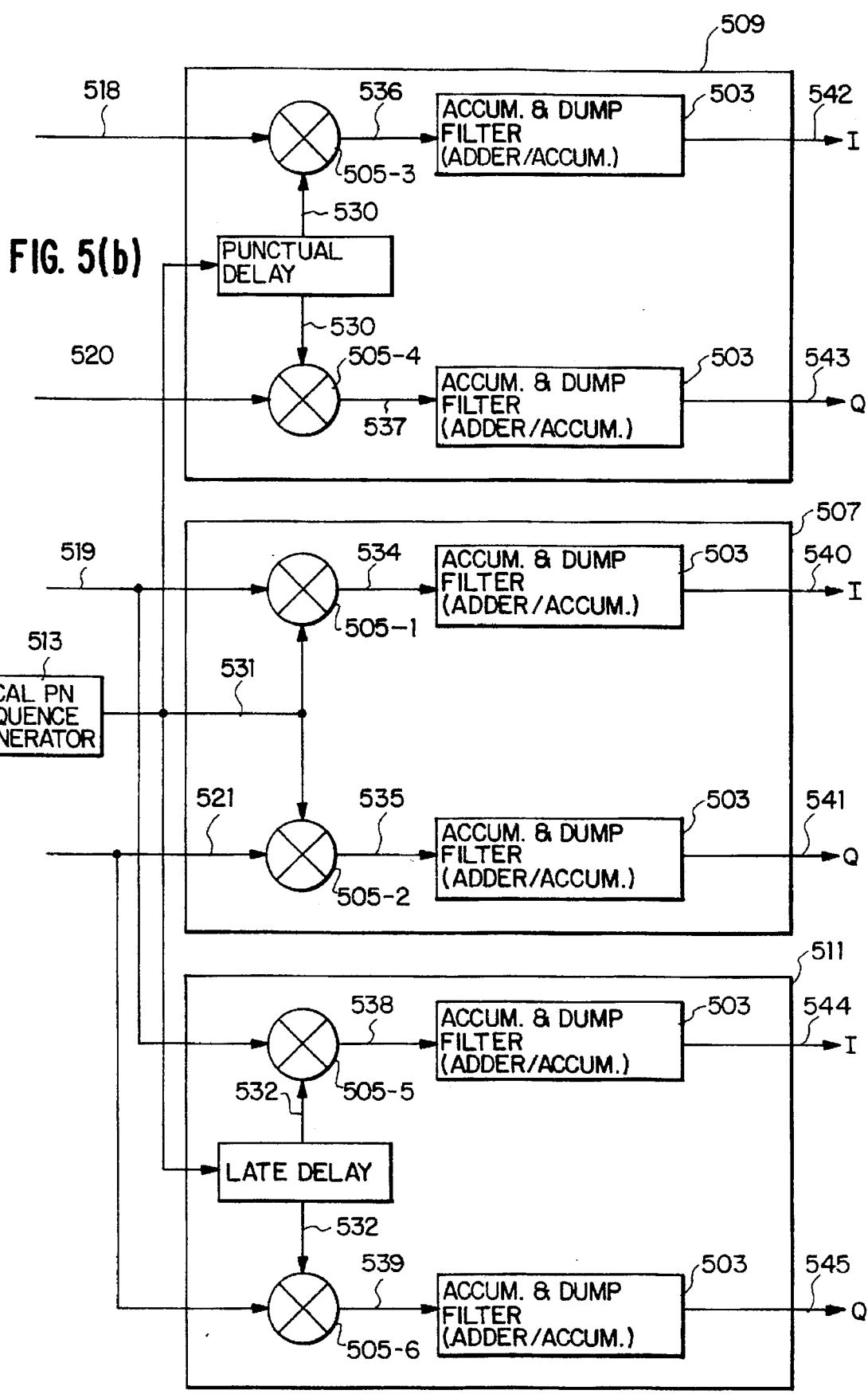
Figure 6A:
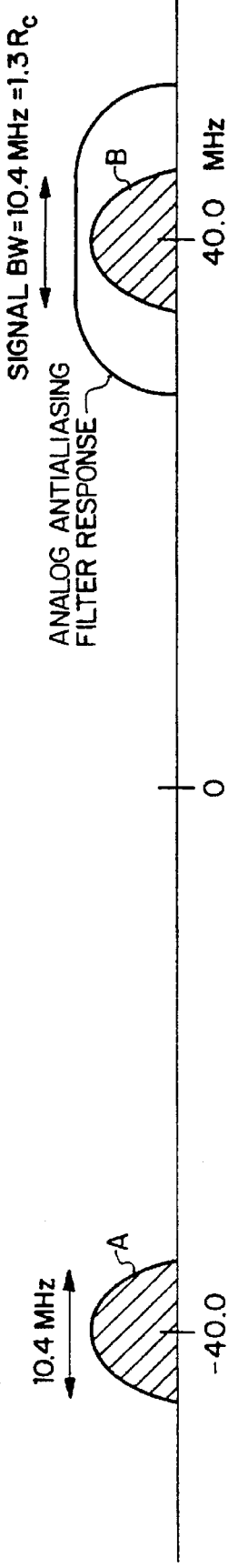
FIGS. 6(a)–6(f) are graphs of the spread spectrum receiver spectrums.

The digital downconverter/despreader concept is illustrated in FIGS. 5(a) and 5(b). The technique is best illustrated by an example. Assume the spread spectrum signal 416 has a chip rate, $R_c$, of 8 MHz and is filtered in the transmitter with a 30% rolloff square-root raised cosine filter. Thus, the transmit signal two-sided bandwidth is 10.4 MHz. RF stage 401 will be designed for an IF frequency, $F_c$, of 40 MHz. Note that the IF frequency must be greater than 5.2 MHz to prevent spectral overlap. Refer to FIG. 6(a) for a spectral plot of the IF signal. At the output of the analog IF mixer 403 there will be spectral components at both −40 MHz and +40 MHz.

Figure 6B:
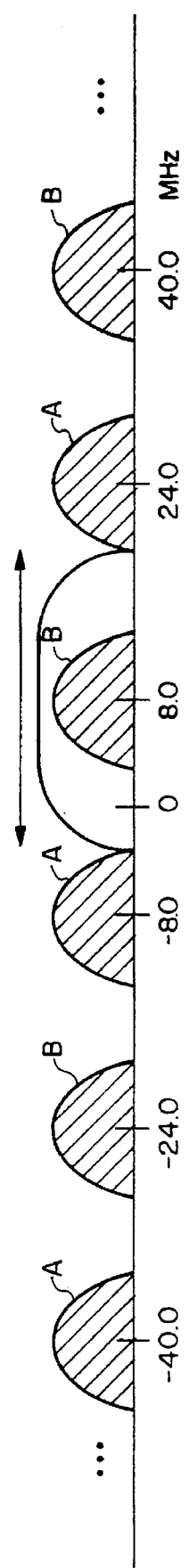

It will be shown that it is highly advantageous to sample at a rate $f_s$ of exactly four times the chip rate, so $f_s$ is chosen to be 32 MHz. A sample clock 410 is generated by a free-running clock generator 412. Sampling spread spectrum signal 416 with A/D converter 406 produces an aliased spectrum as shown in FIG. 6(b). Note that the negative spectral component (designated as A in the figure) and the positive spectral component (designated as B), each repeat every 32 MHz. Also note that the aliased spectrum is symmetric and the two aliases closest to baseband are at $\pm f_s/4 = R_c = 8$ MHz.

The spectral characteristics of the analog antialiasing filter 404 required prior to sampling are shown in FIGS. 6(a) and (b). The signal spectrum shown will also contain a broadband noise component. However, as shown in the figure, if the two-sided stop bandwidth of the filter 404 is at most $2.7 R_c$ (for a signal bandwidth of $1.3 R_c$) the noise components will not alias into the signal bandwidth. Consequently, a filter shape factor of 2:1 is required, which equates to approximately five filter poles. Such a filter can be implemented quite economically.

Figure 6C:
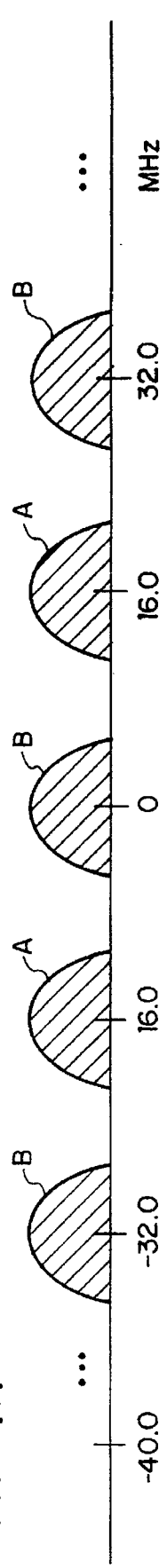
Figure 6D:
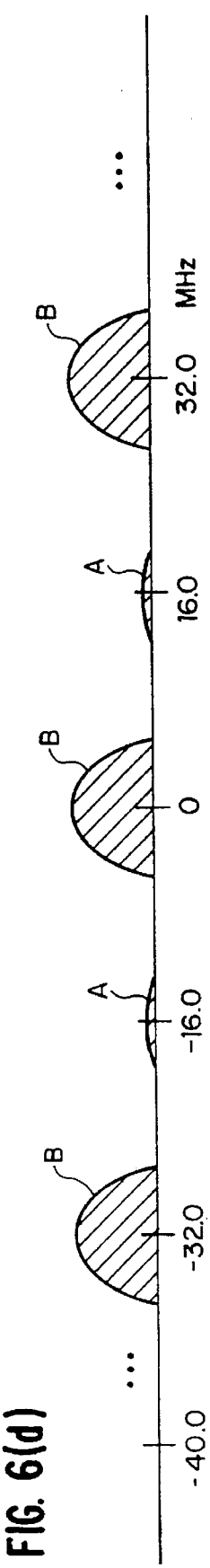

The 8 MHz spectral component is downconverted to baseband as shown in FIG. 5(a) by multiplying the A/D samples 502 by a negative 8 MHz complex sinusoid 506, 508. Since the carrier frequency is exactly one fourth of the sample rate of the A/D sample clock 410, this degenerates to multiplication by sequences of (1, 0, −1, 0, 1, 0, −1, 0 . . . ). The resulting spectrum is shown in FIG. 6(c). The complex baseband signal is filtered with a polyphase lowpass filter 501 to limit the wideband noise and remove the spectral aliases at −16 MHz and +16 MHz, as shown in FIG. 6(d). For optimal signal-to-noise ratio performance, the polyphase filter 501 has an impulse response which is matched to that of the transmitter, 30% square-root raised cosine, in the example case. The polyphase filter 501 also introduces a phase shift in the digital samples 502 to adjust the sample timing phase according to sample timing control signal 418, as will be described below. The filtering process includes a decimator 522 which performs sample rate decimation by a factor of 2:1. Note that any DC offset in the signal prior to A/D downconversion would be shifted into the stopband of the polyphase filter by the digital downconverter 510, 512 and effectively removed.

The real (I) signal 525 is separated into punctual I and early/late I signals 518, 519, respectively, and the imaginary (Q) signal 526 is separated into punctual Q and early/late Q signals 520, 521, respectively, with demultiplexers 523 and control logic 524. The punctual I and Q signals 518, 520, respectively, are then despread by a delayed PN sequence 530 by despreaders 505-3, 505-4, respectively, in punctual channel processor 509, as shown in FIG. 5(b). Assuming proper timing phase alignment between the delayed PN sequence 530 and punctual I and Q signals 518, 520, the despread narrowband spectrum of FIG. 6(e) results. The despread I and Q signals are then processed by accumulate and dump filters 503. Samples of the despread I and Q signals are accumulated for exactly one data symbol period and then the resulting complex data symbol 542, 543 is output to the DSP IC 414. Note that there are actually a total of six despreaders 505-1 . . . 505-6 and accumulate and dump filters 503 for the I and Q components of the early 507, punctual 509 and late 511 channel processors as shown in FIG. 5(b).

Figure 6E:
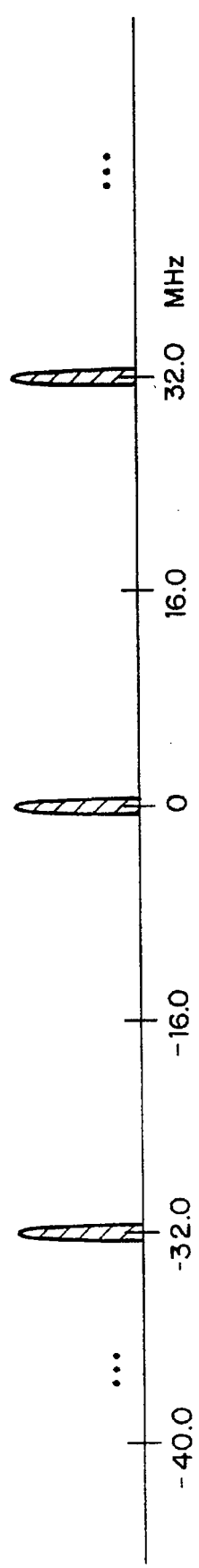
Figure 6F:
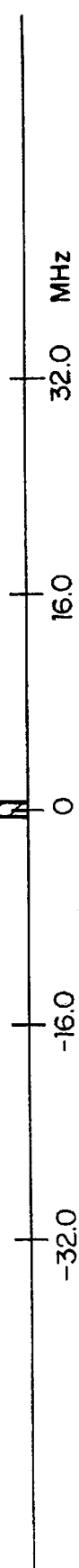

The real (cosine) and imaginary (sine) channels are then both despread by the PN sequence through a despreader 505, producing the narrowband MPSK-modulated spectrum of FIG. 6(e), assuming proper PN timing phase synchronization. The despread signal is then processed by an accumulate and dump filter 503. All the samples are accumulated for exactly one data symbol period in both the I and Q channels and then the resulting complex symbol is output to the DSP chip. Note that there are actually a total of six despreaders 505-1 . . . 505-6 and accumulate and dump filters 503 for the I and Q components of the early 507, punctual 509 and late 511 channel processors as shown in FIG. 5(b).

Digital despreading with a minimal amount of performance loss is greatly enhanced through the use of IF bandpass sampling. The IF frequency must be high enough to avoid any overlap between the sum and difference frequency mixing products in the IF mixer. In other words, the IF frequency must be greater than one half the two-sided signal bandwidth. The digital sample rate must be greater than the signal bandwidth but not necessarily greater than the IF frequency. Thus, sample rate is mainly a function of the signal chipping rate and it is permissible to choose an IF frequency much higher than the sample rate within the constraints of the components selected.

It can be shown that given an IF center frequency $f_c$, sample rate $f_s$, and two-sided signal bandwidth B, the following criteria must be met for ideal bandpass sampling:

$$f_s > 2B \quad (2)$$

$$f_s = \frac{4f_c}{2n+1}, \text{ where } n = \text{any non-negative integer} \quad (3)$$

Therefore, the sample rate must be at least twice the bandwidth of the input signal and must be one of several discrete frequencies determined by the parameter n in equation (3). If $f_s$ is chosen to meet the two criteria, the aliases of the input spectrum will each be equally spaced from one another without overlap and thus the signal will be perfectly represented by the digital samples. It can also be shown that if the two criteria are met, there will be aliased spectral components at $-f_s/4$ and $+f_s/4$. It is convenient to choose a sample rate of $4R_c$, where $R_c$ is the chipping rate and the IF signal will alias to $\pm R_c$ as a result of the sampling process. Choosing such a relationship greatly simplifies the digital processing and permits the use of an antialiasing filter with a 2:1 shape factor (stopband to passband bandwidth ratio).

The A/D converter 406 resolution is not very critical due to the relatively high sample rate compared to the digital symbol rate. The quantization noise spectrum is relatively flat from $-f_s/2$ to $+f_s/2$. After despreading by despreaders 505-1 . . . 505-6, the signal bandwidth is greatly reduced and the majority of the broadband quantization noise will be removed by the accumulate and dump filter 503. For example, given a chipping rate of $255R_s$ ($R_s$ is the data symbol rate), the sample rate will be $4*255R_s=1020R_s$. The bandwidth reduction after despreading and matched filtering will reduce the quantization noise power by $10 \log_{10}(1020) \approx 30$ dB, which corresponds to an increase in resolution of five bits. Five bits of resolution is adequate for BPSK and QPSK demodulation.

In fact, a 1-bit A/D converter (hard limiter) is sufficient for many applications. However, significant distortion products will result from such a converter if there are any narrowband interfering signals within the spread spectrum signal bandwidth. Consequently, a 4-bit A/D converter 406 is preferred in the present invention, giving a signal-to-quantization noise ratio equivalent to a 9-bit converter after the accumulate and dump filter 503.

When sampling at IF frequencies, the timing uncertainty (aperture jitter) of the A/D converter 406 must be small enough that the amplitude error is less than one half an LSB. This error is given by:

$$\Delta t = \frac{2^{-m}}{\pi f_{max}}, m = \text{number of bits of resolution} \quad (4)$$

$f_{max}$=the maximum signal frequency

For m=4 bits and $f_{max}$=200 MHz, $\Delta t$=100 ps. A second constraint is present in that, since an A/D converter's input circuit is lowpass in nature, it must not exhibit much attenuation at $f_{max}$.

Figure 7A:
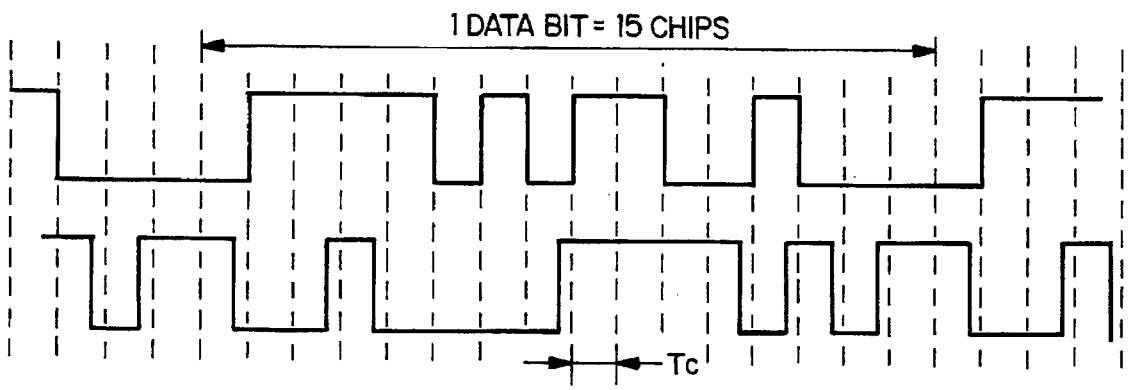
FIGS. 7(a)–(c) are diagrams illustrating the PN timing acquisition and tracking process in the receiver.
Figure 7B:
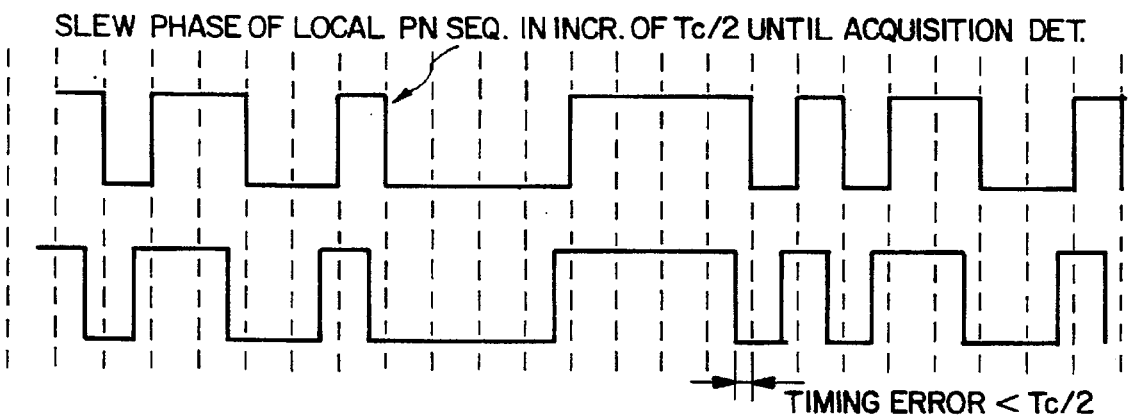

The receiver 112 initially acquires the PN timing phase of the received signal by a repetitive search, correlating the complex baseband received signal 514, 515 with different epochs of the locally generated PN sequence until a peak in narrowband energy is detected. Typically, the time epoch is one-half of a chip period, $T_c/2$. Thus, the locally generated PN sequence can be shifted in increments of two samples at a time until PN synchronization is obtained. As shown in FIG. 7(a), the locally generated PN sequence in the receiver initially is not time synchronized with the PN timing phase of the received signal. After the initial PN timing acquisition process is complete, the locally generated PN sequence will be time synchronized with an error less than $T_c/2$, as shown in FIG. 7(b). There are several well-known acquisition detection techniques which can be implemented and which will not be discussed here.

Figure 7C:
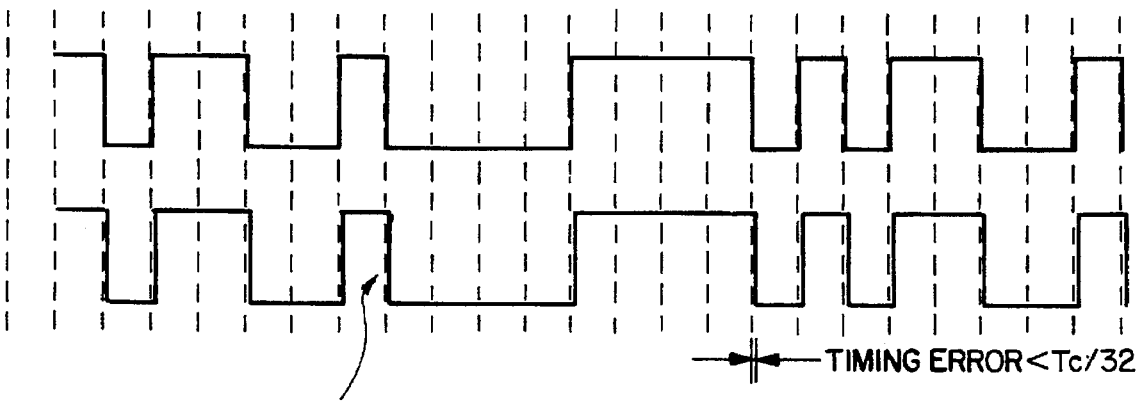

Once acquisition has been obtained, the timing phase of A/D samples 502, relative to the PN timing phase, is tracked by making adjustments much smaller than $T_c/2$ as shown in FIG. 7(c). The timing is steered by the sample timing phase control signal 418 from the early/late synchronization loop. All three channel processors (early 507, punctual 509 and late 511) can be utilized during timing acquisition. The PN sequences going to the despreaders 505 have relative timing offsets of 0, $T_c/2$, and $T_c$ in channel processors 507, 509 and 511, respectively. Therefore, three time epochs can be correlated simultaneously, reducing the acquisition time by a factor of three.

Figure 8:
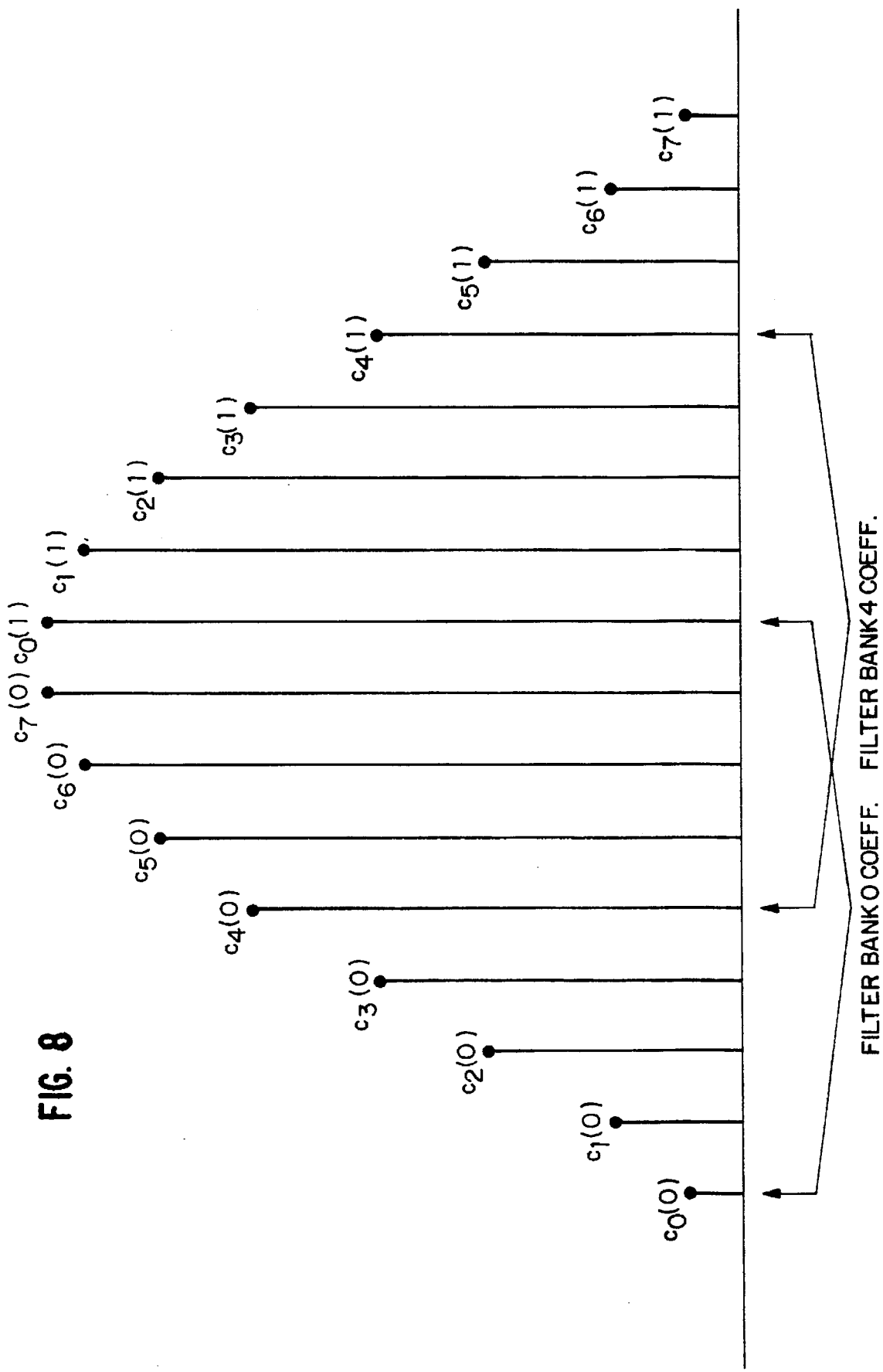
FIG. 8 is a graph of polyphase filter coefficients.

Fine sample timing phase adjustments (to a resolution much finer than a half of a chip period) are made by interpolating the received samples to a higher rate, time-shifting the interpolated samples to the desired timing phase, and then decimating back down to the input sample rate. This process can be implemented quite efficiently using a polyphase filter structure. The filter is simply an FIR lowpass filter designed at a higher, interpolated sample rate. The filter coefficients can then be divided into different banks, each decimated to the input sample rate but with a different time delay. For example, given a 16-tap FIR filter sampled at a rate of 8 Hz, it can be divided into eight two-tap filters, each sampled at a 1 Hz sample rate as shown in FIG. 8. Filter bank 0 would consist of the first and ninth coefficients, filter bank 4 would consist of the fifth and thirteenth coefficients and so on. Timing phase adjustments are then performed by convolving the input samples by the filter bank with the desired delay.

To determine the necessary interpolated sample rate of the filter, a computer simulation was performed to measure the signal loss after the accumulate and dump filter 503 as a function of timing phase error in the despreading PN sequence. A baseband BPSK signal was spread by a PN sequence of length 64 and then despread by the identical sequence shifted in time by various fractions of a chip. The sample rate was 64 samples per chip for a total of 4096 samples per data symbol. The energy of the received symbols after a 4096 sample accumulate and dump operation was then measured. The energy loss as a function of timing offset error is tabulated in Table 2 below.

As shown in Table 2, an offset of $5/64$ $T_c$ causes a despreading loss of less than 0.1 dB. A timing phase resolution of $T_c/32$ is preferred because the loss is negligible (0.014 dB). Given that the A/D converter sample rate is four samples per chip, the polyphase filter must be designed for an interpolation ratio of 8:1. As seen in FIGS. 6(c) and (d), the filter must be sharp enough to remove the alias centered at $2R_c$, but should not disturb the baseband signal spectrum. Such a filter serves to remove white Gaussian noise present on the transmission channel. If it is not removed, the despreading process will spread it across the desired signal bandwidth, decreasing bit error performance. As is known, a filter with two-sided noise bandwidth equal to $R_c$ reduces the noise observed after despreading by an additional 0.5 dB compared to using a filter with a bandwidth of $2R_c$. The filter also can be useful in removing sources of narrowband interference prior to despreading which would also be spread across the desired signal bandwidth by the despreading operation.

TABLE 2

Simulated Signal Energy Loss after Integrate and Dump Filtering Versus Receiver Despreader PN Chip Timing Error Spread factor = 64, 64 samples/chip, Integrate and dump period = 4096 samples

| Rx PN Timing Offset, $T_c/64$ | Signal Loss |
|---|---|
| 0 | 0 dB |
| 1 | .004 dB |
| 2 | .014 dB |
| 3 | .030 dB |
| 4 | .046 dB |
| 5 | .081 dB |
| 6 | .12 dB |
| 7 | .16 dB |
| 8 | .21 dB |
| 9 | .26 dB |
| 10 | .32 dB |
| 16 | .80 dB |

Ideally, the filter impulse response should be matched to the pulse shape of the transmitted chips (where a chip is defined as one epoch of the PN sequence). The raised cosine pulse shape provides the necessary bandlimiting characteristic in addition to having the property that it exhibits zero intersymbol interference (inter-chip interference in this case). For matched filtering, both the transmit filter and the receiver polyphase filter 501 will have identical square-root raised cosine frequency responses.

Figure 9:
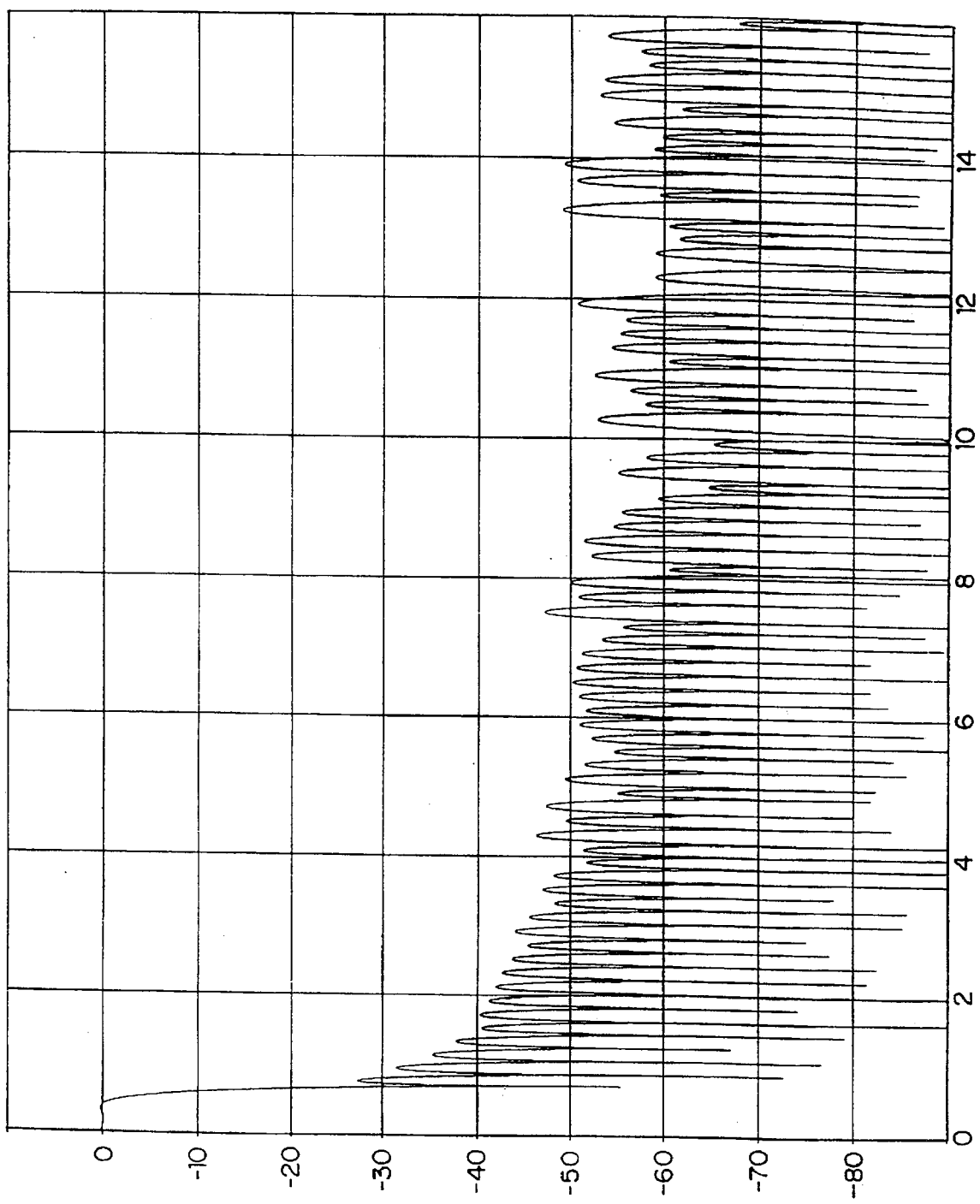
FIG. 9 is a graph of the frequency response of a 30% square root raised cosine filter.
Figure 10:
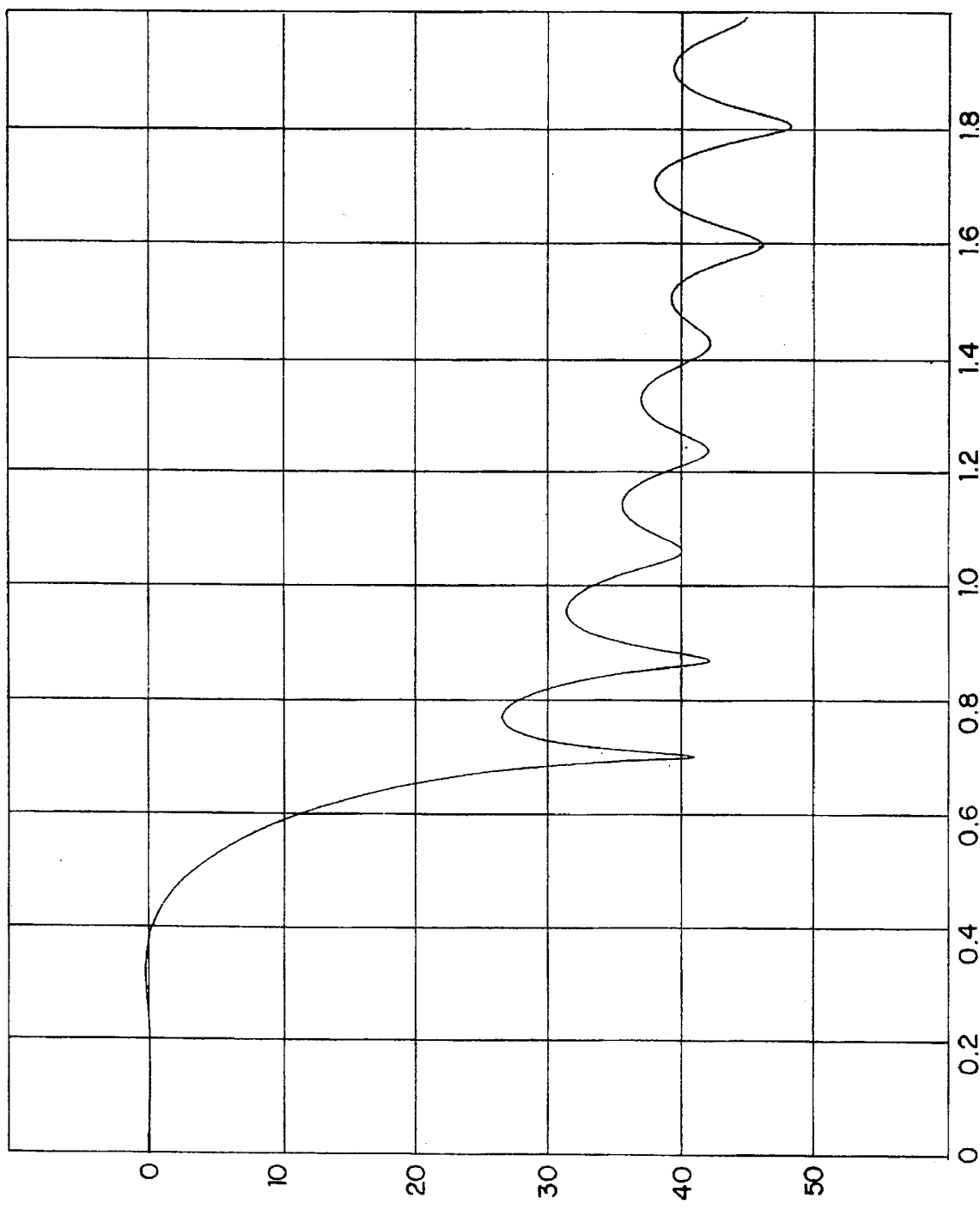
FIG. 10 is a graph of the frequency response of filter bank 0.

A 30% square-root raised cosine response can be approximated quite well with an aperture of 5 chip periods. The filter is designed at a sample rate of 32 samples per chip, for a total of 160 taps. The filter is divided into eight banks of 20 taps each. Thus, each output is obtained by convolving the input samples with a 20-tap filter. Nine-bitquantization of the coefficients is sufficient for near-ideal performance. Refer to FIG. 9 for a plot of the frequency response. The absolute delays of each bank are listed in Table 3. Note that each successive bank has a delay of $T_c/32$ less than the previous one. Each bank has essentially the same frequency response and the response of bank 0 is plotted in FIG. 10. To retard the timing phase by $T_c/32$, the filter coefficients should be changed to bank n-1 from bank n. To advance the phase by $T_c/32$, the bank should be changed to n+1 from bank n. Discussion of these functions, for example, the boundary conditions of crossing over bank 0 or 7 will be discussed below.

TABLE 3

Delay of Polyphase Filter Banks, Filter Sample Rate = 32 sample/chips

| Filter Bank Number | Delay |
|---|---|
| 0 - (c0, c8, c16, ... ,c152) | $79.5 \cdot T_c/32$ |
| 1 - (c1, c9, c17, ... ,c153) | $78.5 \cdot T_c/32$ |
| 2 - (c2, c10, c18, ... ,c154) | $77.5 \cdot T_c/32$ |
| 3 - (c3, c11, c19, ... ,c155) | $76.5 \cdot T_c/32$ |
| 4 - (c4, c12, c20, ... ,c156) | $75.5 \cdot T_c/32$ |
| 5 - (c5, c13, c21, ... ,c157) | $74.5 \cdot T_c/32$ |
| 6 - (c6, c14, c22, ... ,c158) | $73.5 \cdot T_c/32$ |
| 7 - (c7, c15, c23, ... ,c159) | $72.5 \cdot T_c/32$ |

A process to simplify the polyphase filtering, downconversion, and despreading operations will now be shown. Assume we are given the following:

Chipping rate=$R_c$=$1/T_c$

Sample rate=$f_s$=4 samples/chip

Sample period=$T_c/4$

Carrier frequency after sampling=$f_s/4$=$R_c$

Spread factor (number of chips per data symbol)=N

Although not a necessary condition, for the current system it is also assumed that the PN sequence is synchronized with each data symbol, and thus, the N-length PN sequence repeats every symbol. The A/D samples 502 are denoted as x(n), where n is the sample index, and the sample time= $nT_c/4$. As shown in FIG. 5, the A/D samples 502 are first downconverted to a complex baseband signal 514, 515, denoted as y(n), by multiplying the samples by the complex exponential 506, 508 through multipliers 510, 512, respectively:

$$y(n)=x(n) \ e^{j2\pi nf_s/4/f_s}=x(n) \ e^{j2\pi nR_c/4R_c}=x(n) \ e^{jn\pi/2} \qquad (5)$$

Solving equation (5) in terms of its real and imaginary components, $y^r$ and $y^i$, respectively, gives the following sequence:

real: $y^r(n) = x(n) \cdot (-1)^{n/2}$    for $n$ even      (6a)
      = 0    for $n$ odd imag: $y^i(n) = x(n) \cdot (-1)^{(n-1)/2}$    for $n$ odd      (6b)
      = 0    for $n$ even Next, the complex baseband sequence y(n) is convolved with a bank of polyphase filter coefficients. Each bank contains 20 real coefficients, $c_0, c_1, \ldots c_{19}$. It is noted that here that the coefficients for a particular bank have been redesignated $c_0$ through $c_{19}$ for notational simplicity. It is understood that they are a subset of the original $c_0$ through $c_{159}$ coefficients. The convolution of y with the filter coefficients is given by:

$$z^r(n) = \sum_{j=0}^{19} c_j \cdot y^r(n-j) \qquad (7a)$$

$$z^i(n) = \sum_{j=0}^{19} c_j \cdot y^i(n-j) \qquad (7b)$$

Equations (7a) and (7b) each assume that the filter outputs, z(n) 516, 517 are computed at a rate of four samples per chip. However it is only necessary to compute a filter output at a rate of two samples per chip. As shown in FIG. 5(a), signals 516, 517 are thus decimated to one-half the rate of the sample clock 410 by decimator 522. Signals 516, 517 consist of one sample aligned with the center of each raised cosine pulse (the chip detection point) per chip and one sample per chip at the chip transition point.

In addition, a demultiplexer 523 coupled with control logic 524 is used to separate the chip transition point samples 519, 521 from the chip detection point samples 518, 520. Signals 518, 520 drive the punctual channel processor 509, as shown in FIG. 5(b). Signals 519, 521 drive both the early channel processor 507 and the late channel processor 511. Signals 519, 521 are delayed in time by $T_c/2$ from the punctual samples 518, 520. The sample rate of signals 518–521 is one sample per chip.

A delay locked loop is used to track the PN sequence timing phase. Consequently, a total of three channel processors 507, 509, 511 are required. The delay locked loop requires an early channel processor 507 where the received samples are despread by a PN sequence advanced by $T_c/2$ in time, and a late channel processor 511 where the received samples are despread by a PN sequence delayed by $T_c/2$ in time, relative to the timing phase of the PN sequence applied to the punctual channel.

It is apparent that each convolution operation only involves ten filter coefficients since every other sample of complex baseband signal 514, 515 is zero. It is also easy to show that the convolution operation for the complex early/late output samples 519, 521 utilizes the same filter coefficients as for the complex punctual outputs 518, 520 except the sign of the complex early/late outputs must be reversed. However, it is simpler to just ignore the sign change and account for it later in the calculation of the delay locked loop error signal in the DSP IC 414.

The complex punctual filter outputs 518, 520 will be denoted as $z_p(m)$, and the complex early/late filter outputs 519, 521 will be denoted as $z_{el}(m)$, where it is understood that m=0 corresponds to the optimal detection time for the punctual channel processor 509. The filter outputs are computed once per chip interval according to the following equations:

$$z^r_{p(m)} = \sum_{j=0}^{9} c_{2j} \cdot (-1)^j \cdot x(m-2j), \qquad (8a)$$
$$m = 0, 4, 8, \ldots$$

$$z^i_{p(m)} = \sum_{j=0}^{9} c_{2j+1} \cdot (-1)^{j+1} \cdot x(m-2j-1), \qquad (8b)$$
$$m = 0, 4, 8, \ldots$$

$$z^r_{el(m)} = -\sum_{j=0}^{9} c_{2j} \cdot (-1)^j \cdot x(m-2j), \qquad (8c)$$
$$m = 2, 6, 10, \ldots$$

$$z^i_{el(m)} = -\sum_{j=0}^{9} c_{2j+1} \cdot (-1)^{j+1} \cdot x(m-2j-1), \qquad (8d)$$
$$m = 2, 6, 10, \ldots$$

For efficiency, the terms of the form $c_{2n} \cdot (-1)^n$ may be pre-computed so that the downconversion and polyphase filtering operations are combined into one convolution operation. Thus, the coefficients are stored in hardware with the sign of every other coefficient inverted.

After the above convolution operations are performed, the punctual samples are despread by the punctual despreaders 505-3, 505-4 and the early/late samples are despread by both the early 505-1, 505-2 and the late 505-5, 505-6 despreaders. The PN sequence, PN(), applied to each channel processor 507, 509, 511 will have the appropriate delay. Then a data symbol d(k) can be recovered after despreading and processing by an accumulate and dump filter 503. In the despreading operations of Equations 9(a)–9(f) below, $d_p(k)$, $d_e(k)$, and $d_l(k)$, refer to the complex data symbol 542, 543, complex early timing error signal 540, 541 and complex late timing error signal 544, 545 outputs associated with the $k^{th}$ data symbol where each output is computed once per data symbol interval. The argument of $z_p$ refers to the chip time index, where it is understood that the argument of $z_{el}$ refers to an absolute time of $T_c/2$ earlier than the same argument of $$d_p^r(k) = \sum_{j=0}^{N-1} z_p^r(j+Nk)PN(j) \qquad (9a)$$

$$d_p^i(k) = \sum_{j=0}^{N-1} z_p^i(j+Nk)PN(j) \qquad (9b)$$

$$d_e^r(k) = \sum_{j=0}^{N-1} z_{el}^r(j+Nk)PN(j) \qquad (9c)$$

$$d_e^i(k) = \sum_{j=0}^{N-1} z_{el}^i(j+Nk)PN(j) \qquad (9d)$$

$$d_l^r(k) = \sum_{j=0}^{N-1} z_{el}^r(j+Nk)PN(j-1) \qquad (9e)$$

$$d_l^i(k) = \sum_{j=0}^{N-1} z_{el}^i(j+Nk)PN(j-1) \qquad (9f)$$

It is assumed that sample timing adjustments can be made only at symbol boundaries. Normally, timing adjustments are made simply by changing to a new bank of filter coefficients as determined by the sample timing control signal 418. However, if a timing adjustment crosses an A/D sample ($T_c/4$) boundary, an additional step is necessary. For example, if the current sample timing is achieved by using the last polyphase filter bank (bank 7) and it is desired to advance the timing by $T_c/32$, the filter input delay line must be advanced by one sample. Filter bank zero must then be selected to achieve the proper timing. Similarly, if it is desired to retard the timing phase by $T_c/32$ and polyphase filter bank zero is currently selected, it is necessary to delay the filter input delay line by one sample (i.e., reuse the current sample instead of shifting in a new one) and select polyphase filter bank seven. The two cases are outlined below and show the effects of the polyphase filtering operation.

Case 1—Advancing the timing phase across a sample boundary

To advance the timing $T_c/32$ when polyphase filter bank seven is selected, three new A/D samples must be shifted into the filter delay line instead of the usual four before generating the next filter output. Thus, the filter hardware is advanced by one A/D sample period ($8T_c/32$). In addition, filter bank zero is selected, retarding the timing by $7T_c/32$ for a net timing advance of $T_c/32$. However, there is an additional change that must be considered. The digital downconversion process is not affected by the sample timing shift since it occurs before timing adjustments are made. But the filtering process is affected. For example, assume that a complex punctual filter output 518, 520 at time index m=α was just computed, therefore, according to equations 8(a) and 8(b):

$$z_p^r(\alpha)=c_0x(\alpha)-c_2x(\alpha-2)+c_4 x(\alpha-4)-c_6 x(\alpha-6)+c_8x(\alpha-8)-c_{10}x(\alpha-10) +c_{12}x(\alpha-12)-c_{14} x(\alpha-14)+c_{16}x(\alpha-16)-c_{18}x(\alpha-18) \quad (10a)$$

$$z_p^i(\alpha)=-c_1x(\alpha-1)+c_3x(\alpha-3)-c_5x(\alpha-5)+c_7x(\alpha-7)-c_9x(\alpha-9)+c_{11}x(\alpha-11) -c_{13}x(\alpha-13)+c_{15}x(\alpha-15)-c_{17}x(\alpha-17)+c_{19}x(\alpha-19) \quad (18b)$$

Normally, the next punctual filter output is not computed until time $t=(\alpha+4).T_c/4$. To make a timing adjustment, compute the next output as soon as $x(\alpha+3)$ has been shifted into the filter delay line. After accounting for the downconversion process, the following is computed:

$$z_p^r(\alpha+3)=-c_1x(\alpha+2)+c_3x(\alpha)-c_5x(\alpha-2)+c_7x(\alpha-4)-c_9x(\alpha-6)+ c_{11}x(\alpha-8) -c_{13}x(\alpha-10)+c_{15}x(\alpha-12)-c_{17}x(\alpha-14)+c_{19}x(\alpha-16)(11a)$$

$$z_p^i(\alpha+3)=-c_0x(\alpha+3)+c_2x(\alpha+1)-c_4x(\alpha-1)+c_6x(\alpha-3)-c_8x(\alpha-5)+ c_{10}x(\alpha-7) -c_{12}x(\alpha-9)+c_{14}x(\alpha-11)-c_{16}x(\alpha-13)+c_{18}x(+15)(11b)$$

Note that the convolution operation is the same as in equation (10) above except that the coefficients used for the punctual real and imaginary outputs 518, 520 have been swapped and the signs of the coefficients now used for the imaginary output 520 have been reversed. The filter coefficients could be modified to reflect the new changes but it is simpler to leave them unaltered and account for them in the DSP control processor 414 after despreading. The DSP can then just swap real and imaginary symbols 542, 543 and perform the required sign inversions at the symbol rate.

The filter hardware will have to run slightly faster to handle this case. The first filter output at the advanced timing phase has to be computed one A/D sample period earlier than usual. An A/D sample clock that is slightly faster than four samples per chip could be used so that the hardware always acts to retard the timing phase. Another approach is to just not compute a filter output until the hardware is ready. The energy reduction for zeroing the output for one chip interval is negligible, especially for large spread factors. For example, for a spread factor of 64, deleting one output sample (chip) would reduce the signal energy of one symbol by 63/64 or 0.14 dB. Assuming that timing adjustments do not occur every symbol, the loss is negligible, especially in systems employing forward error correction coding.

Case 2—Retarding the timing phase across a sample boundary

To retard the timing by $T_c/32$ when polyphase filter bank zero is selected, five new samples are shifted into the filter delay line instead of the usual four before generating the next filter output. Thus, the filter hardware is delayed by one sample. In addition, filter bank seven is selected. Similar to advancing the timing phase across a sample boundary, case 1, the filter outputs must be modified. Again, assume that a complex punctual filter output was just computed at sample time index m=α and it is desired to retard the timing phase. To make a timing adjustment, shift $x(\alpha+1)$, $x(\alpha+2)$, $x(\alpha+3)$, $x(\alpha+4)$ and $x(\alpha+5)$ into the filter delay line and, after accounting for the downconversion process, according to equations 12(a) and 12(b):

$$z_p^r(\alpha+5)=c_1x(\alpha+4)-c_3x(\alpha+2)+c_5x(\alpha)-c_7x(\alpha-2)+c_9x(\alpha-4)- c_{11}x(\alpha-6) +c_{13}x(\alpha-8)-c_{15}x(\alpha-10)+c_{17}x(\alpha-12)-c_{19}x(\alpha-14)(12a)$$

$$z_p^i(\alpha+5)=c_0x(\alpha+5)-c_2x(\alpha+3)+c_4x(\alpha+1)-c_6x(\alpha-1)+c_8x(\alpha-3)- c_{10}x(\alpha-5) +c_{12}x(\alpha-7)-c_{14}x(\alpha-9)+c_{16}x(\alpha-11)-c_{18}x(\alpha-13) \quad (12a)$$

Note that the real and imaginary filter coefficients have been swapped (as compared to equation (10)) as in case 1 above, but the signs of the coefficients now used for the real output 518 have been reversed. As in case 1, the DSP IC 414 can just swap real and imaginary symbols 542, 543 and perform the required sign inversions. Thus the filtering and despreading operations do not have to be modified.

Figure 11:
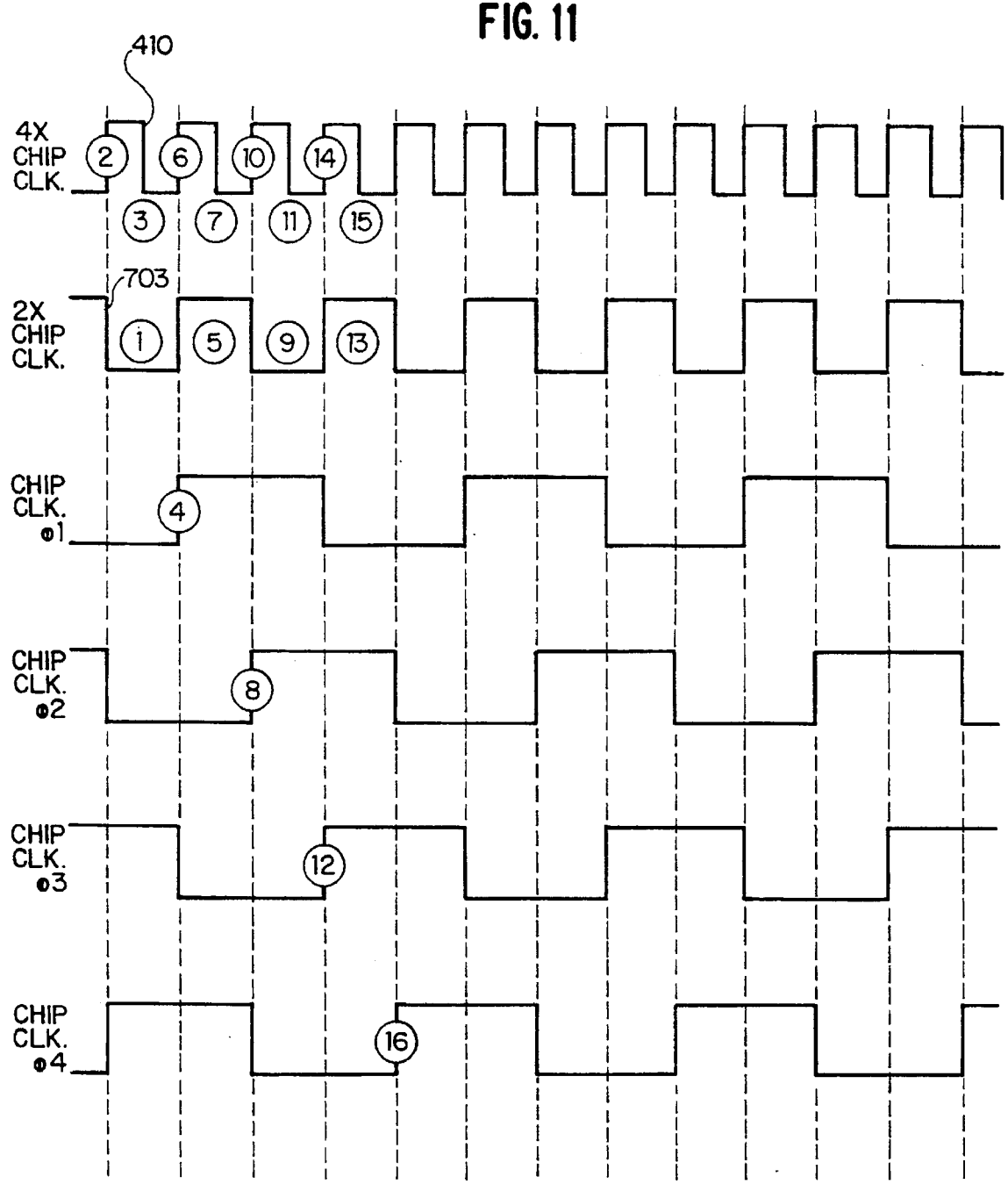
FIG. 11 is a timing diagram representing the timing relationship between various signals found in a preferred embodiment of the present invention.

It has been described how the downconversion and pre-despreading filtering operations reduce to convolving the real A/D input sequence by a selected bank of ten complex coefficients and then decimating the sample rate by a factor of two to two samples per chip. A specific embodiment of the present invention used to perform the computations symbolized in FIGS. 5(a) and 5(b) as part of the overall spread spectrum receiver of FIG. 4 will now be discussed. FIG. 11 is a timing diagram to be referenced in conjunction with FIGS. 12 and 13 which are simplified hardware block diagrams.

Figure 12:
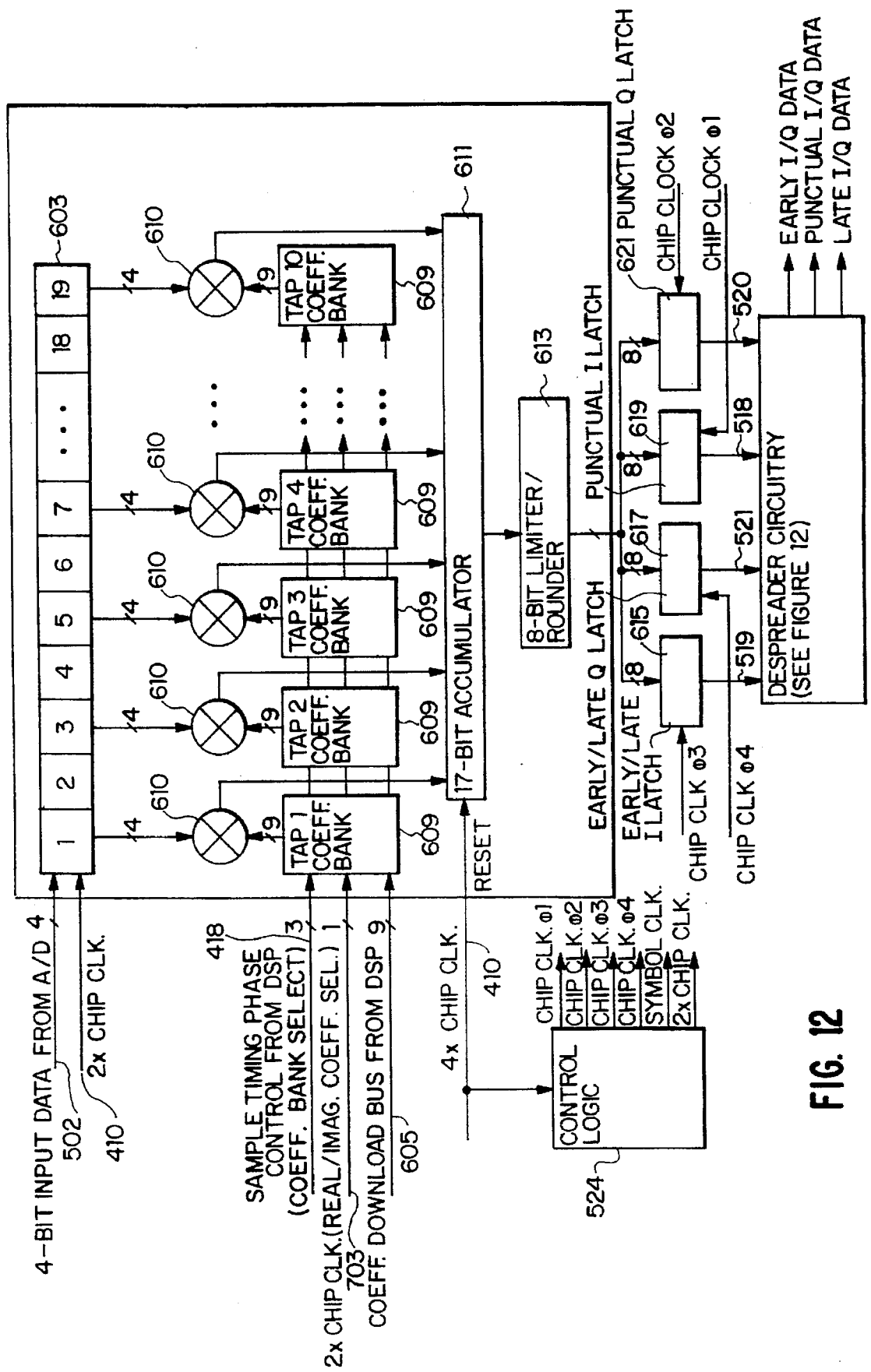
FIG. 12 is a block diagram of a digital despreader/downconverter constructed in accordance with the preferred embodiment of the present invention.

As seen in FIG. 12, a 4-bit A/D input bus 502 is connected to a 4-bit ×19 delay line (shift register file) 603. On the rising edge of each sample clock (4X Chip Clock) 410, as seen in FIG. 11, each bit of an A/D sample is clocked into one of four parallel shift registers. The filter coefficients are stored in ten arrays of 16×9-bit static RAM 609 which can be downloaded by DSP IC 414 or other control logic over an external 9-bit bus 605. Each RAM array 609 stores coefficients for one of the 10 filter taps and supplies a 9-bit operand to its associated multiplier 610. Each RAM array stores eight real coefficients followed by eight imaginary coefficients, corresponding to the eight different filter banks. A 3-bit bus 418 controls which of the eight filter banks to use, and is steered by timing adjustment control logic. Additional logic must also be provided to advance or retard the input delay line when changing the sample timing phase across a sample boundary. The signal "2X Chip Clock" 703 selects between the real and imaginary coefficients at every A/D sample period. Ten 4×9-bit multipliers 610 are used to perform all ten filter tap multiplications in parallel. The 13-bit results are added together in a single clock cycle and the result is stored in a 17-bit accumulator 611. The accumulator 611 is large enough that no overflow will occur. The resulting sum is then saturated to the most negative or most positive 8-bit value if necessary or else rounded to the nearest 8-bit value by an 8-bit limiter/rounder 613. The 8-bit result is latched into one of four output latches 615, 617, 619, 621.

It can be seen that the hardware of FIG. 12 performs a convolution every A/D sample period and the logic is structured to alternate between the I and Q channels. Pairs of I,Q outputs alternate between the punctual and early/late processing channels. Thus there are a total of four output latches 615, 617, 619, 621 each clocked by a different phase $\phi 3$, $\phi 4$, $\phi 1$, $\phi 2$ of the chip clock. Each chip clock phase is offset in time from another by one fourth of a chip period, as can be seen in the timing diagram of FIG. 11. The sequence of operations performed in one chip clock period are labeled in numerical order in FIG. 11. The labels are defined below:

Sequence of Operations

1. Select real coefficients while 2X Chip Clock is low
2. Shift in a new A/D sample 502 on the rising edge of 4X Chip Clock 410
3. Compute convolution of delay line 603 with real coefficients 4. Latch Punctual I output 518 on rising edge of Chip Clock φ1
5. Select imaginary coefficients while 2X Chip Clock 703 is high
6. Shift in a new A/D sample 502 on the rising edge of 4X Chip Clock 410
7. Compute convolution of delay line 603 with imaginary coefficients
8. Latch Punctual Q output 520 on rising edge of Chip Clock φ2
9. Select real coefficients while 2X Chip Clock 703 is low
10. Shift in a new A/D sample 502 on the rising edge of 4X Chip Clock 410
11. Compute convolution of delay line 603 with real coefficients
12. Latch Early/Late I output 519 on rising edge of Chip Clock φ3
13. Select imaginary coefficients while 2X Chip Clock 703 is high
14. Shift in a new A/D sample 502 on the rising edge of 4X Chip Clock 410
15. Compute convolution of delay line 603 with imaginary coefficients
16. Latch Early/Late Q output 521 on rising edge of Chip Clock φ4

Figure 13:
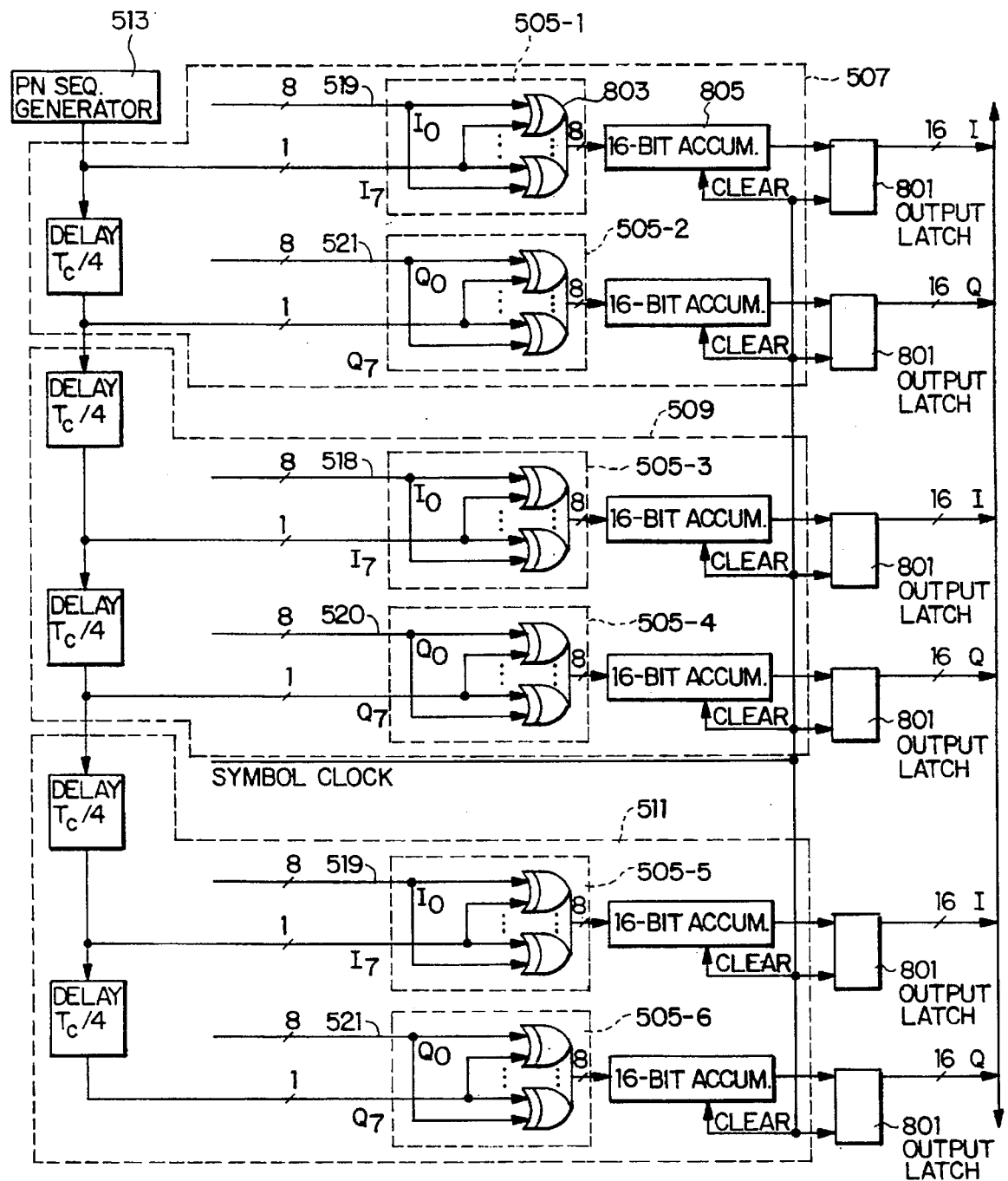
FIG. 13 is a block diagram showing further details of the digital despreader/downconverter constructed in accordance with the preferred embodiment of the present invention.

The signals 519, 521, 518, 520 from the I and Q output latches 615,617, 619, 621, respectively, drive the early, punctual and late (real and imaginary) channel processors 507, 509, 511 as shown in FIG. 13. The structure of the PN sequence generator 513 depends on the type of code implemented but is typically constructed with shift registers and Exclusive-Or gates. The PN sequence generator 513 is clocked at the chip rate, but is delayed in increments of one fourth of a chip period before being connected to each successive despreader and drives the early I channel despreader 505-1 directly. The PN sequence is delayed by one fourth of a chip period before driving the early Q channel despreader 505-2 since the Q channel is computed $T_c/4$ seconds later than the I channel. It can be seen that if the PN sequence is delayed an additional $T_c/4$ seconds before driving the next despreader in sequence, that the proper timing relationships are maintained for an early/late delay locked loop with timing offsets of $\pm T_c/2$ relative to the punctual channel. Additional control logic is required to shift the relative timing phase of the PN sequence in increments of $T_c/2$ during code acquisition. Once acquisition is achieved, the PN timing is fixed and timing tracking is accomplished through the sample timing phase control signal 418.

The despreaders 505-1 ... 505-6 are each actually eight parallel Exclusive-Or gates 803 which either invert the data or not depending on the state of the PN sequence. The despread outputs are summed in 16-bit accumulators 805. The accumulated sums are latched in tri-state output latches 801 every data symbol clock (i.e. for one complete period of the PN sequence). The accumulators 805 are also cleared on the same edge of the symbol clock. An accumulator width of sixteen bits is sufficient for spread factors up to 256 without any possibility of overflow. For larger spread factors, scaling and saturation logic must be incorporated into each accumulator. The six output latches 801 can be made addressable so that they can be read over a common data bus.

A method and apparatus to perform ideal matched filtering of a spread spectrum signal, assuming that the transmit signal has a square-root raised cosine response, has been outlined. The method may also be used for cases where matched filtering is not required or necessary. For example, if the spread spectrum transmit signal is unfiltered or is filtered with a full raised cosine filter response, the polyphase receive filter can have any desired lowpass response. The chip detection process will not be ideal since the polyphase receive filter impulse response is not matched to the transmit spread spectrum signal, but in many cases the loss is less than 1 dB. In addition, the number of filter taps for an equi-ripple lowpass filter is often much less than that required for a square-root raised cosine filter.

For example, consider the case of a transmitter employing a 20% full raised cosine transmit filter after the spreading operation. A polyphase lowpass receive filter can be designed with the characteristics shown in Table 4.

TABLE 4

| Polyphase Equi-ripple Lowpass Filter Characteristics | |
|---|---|
| Filter Type | Lowpass |
| Filter Length | 88 taps |
| Sampling Frequency | $32 R_c$ |
| Quantization: | 9 bits |
| Passband Edge: | $R_c/2$ |
| Normal Gain | 1.00 |
| Maximum Passband Ripple | 0.0778 dB |
| Lower Stopband Edge | $1.54 R_c$ |
| Upper Stopband Edge | $16 R_c$ |
| Minimum Stopband Attenuation | −51.66 dB |

Although the filter is not matched to the transmit signal, it still serves to make digital timing corrections and also bandlimits the noise spectrum prior to despreading. The number of taps has also been significantly reduced and the number of hardware multipliers required for the filtering operation can be reduced from ten to six. The estimated loss in bit error performance for such a receiver structure is less than 1 dB.

In light of the above teachings, many modifications in variations of the present invention are possible. It should be understood, therefore, that the principles of the present invention may be realized in embodiments other than as specifically described herein.

I claim:

1. An apparatus for digitally downconverting and despreading an analog direct sequence spread spectrum signal, comprising:

a free-running, non-steered, clock generator which outputs an A/D sample clock;

the A/D sample clock having a rate which is an integral multiple of a chip rate of the spread spectrum signal;

an A/D converter which receives the spread spectrum signal and the A/D sample clock and outputs a digitized signal from the spread spectrum signal;

a local pseudo-noise sequence signal generator which outputs a local pseudo-noise sequence signal; and a complex downconverter/polyphase filter which receives the digitized signal and the A/D sample clock and a sample timing phase control signal, simultaneously filters and downconverts the digitized signal to baseband, corrects timing phase misalignment between the digitized signal and the locally generated pseudo-noise sequence signal, and outputs a complex corrected baseband signal.

2. An apparatus for digitally downconverting and despreading an analog direct sequence spread spectrum signal as recited in claim 1, wherein an impulse response of the downconverter/polyphase filter is matched to a pulse shape of the spread spectrum signal.

3. An apparatus for digitally downconverting and despreading an analog direct sequence spread spectrum signal, comprising:

a free-running, non-steered, clock generator which outputs an A/D sample clock;

the A/D sample clock having a rate which is an integral multiple of a chip rate of the spread spectrum signal;

an A/D converter which receives the spread spectrum signal and the A/D sample clock and outputs a digitized signal from the spread spectrum signal;

a local pseudo-noise sequence signal generator which outputs a local pseudo-noise sequence signal;

a complex downconverter/polyphase filter which receives the digitized signal and the A/D sample clock and a sample timing phase control signal, simultaneously filters and downconverts the digitized signal to baseband, corrects timing phase misalignment between the digitized signal and the locally generated pseudo-noise sequence signal, and outputs a complex corrected baseband signal;

wherein an impulse response of the downconverter/polyphase filter is matched to a pulse shape of the spread spectrum signal;

a demultiplexer which receives the complex corrected baseband signal from the complex downconverter/polyphase filter and separates the complex corrected baseband signal into a complex punctual signal and a complex early/late signal and outputs the complex punctual and early/late signals;

wherein the complex punctual signal consists of samples of the complex corrected baseband signal detected at chip detection points; and the complex early/late signal consists of samples of the corrected signal detected at chip transition points;

an early channel processor which receives the complex early/late signal, despreads and accumulates the complex early/late signal using the locally generated pseudo-noise sequence signal and outputs a complex early timing error signal;

a punctual channel processor which receives the complex punctual signal, delays the locally generated pseudo-noise sequence signal, despreads and accumulates the punctual signal using the delayed locally generated pseudo-noise sequence signal, and outputs a complex data symbol;

a late channel processor which receives the complex early/late signal, further delays the locally generated pseudo-noise sequence signal, relative to the delayed locally generated pseudo-noise sequence signal, despreads and accumulates the early/late signal using the further delayed locally generated pseudo-noise sequence signal and outputs a complex late timing error signal; and a digital signal processor which receives the complex early timing error signal, the complex data symbol and the complex late timing error signal and performs coherent carrier frequency and phase tracking and MPSK demodulation on a complex data symbol and which outputs a demodulated data bit, sample timing phase control signal and filter coefficient values.

4. The apparatus as recited in claim 3 wherein the complex downconverter/polyphase filter further comprises:

a delay line which receives the digitized signal and the A/D sample clock;

a memory array storing coefficient data in a plurality of memory banks;

a plurality of multipliers, one per each memory bank, respectively, wherein each multiplier receives a tapped output from the delay line and selected coefficient data from the respective memory bank and outputs a product value;

an accumulator which receives the product value from each one of the plurality of multipliers and which outputs an accumulated value; and a limiter/rounder circuit which receives the accumulated value and outputs a limited/rounded value;

wherein the selectable coefficient data from each memory bank is determined by the sample timing phase control signal.

5. An apparatus as recited in claim 3 wherein the demultiplexer comprises:

control logic which receives the A/D sample clock and generates a plurality of clock signals, each clock signal having a frequency equal to the chip rate of the spread spectrum signal and each clock signal offset in time with a next clock signal; and a plurality of latches, one latch per each clock signal, respectively, each latch receiving the corrected baseband signal and the respective clock signal and outputting a demultiplexed signal.

6. An apparatus as recited in claim 4 wherein the demultiplexer comprises:

control logic which receives the A/D sample clock and generates a plurality of clock signals, each clock signal having a frequency equal to the chip rate of the spread spectrum signal and each clock signal offset in time with a next clock signal; and a plurality of latches, one latch per each clock signal, respectively, each latch receiving the corrected baseband signal and the respective clock signal and outputting a demultiplexed signal.

7. The apparatus as recited in claim 3 wherein, the early channel processor comprises:

a first despreader which receives a real component of the complex early/late signal and the local pseudo-noise sequence signal and outputs a first despread signal;

a first accumulate and dump filter which receives the first despread signal and outputs a real (I) component of the complex early timing error signal;

a second despreader which receives an imaginary component of the complex early/late signal and the local pseudo-noise sequence signal and outputs a second despread signal;

a second accumulate and dump filter which receives the second despread signal and outputs an imaginary (Q) component of the complex early timing error signal; and the punctual channel processor comprises:

a punctual delay element which receives the local pseudo-noise sequence signal and outputs a punctual delayed local pseudo-noise sequence signal;

a third despreader which receives a real component of the complex punctual signal and the punctual delayed local pseudo-noise sequence signal and outputs a third despread signal;

a third accumulate and dump filter which receives the third despread signal and outputs a real (I) component of the complex data symbol;

a fourth despreader which receives an imaginary component of the complex punctual signal and the delayed local pseudo-noise sequence signal and outputs a fourth despread signal;

a fourth accumulate and dump filter which receives the fourth despread signal and outputs an imaginary (Q) component of the complex data symbol; and the late channel processor comprises:

a late delay element which receives the local pseudo-noise sequence signal and outputs a late delayed local pseudo-noise sequence signal;

a fifth despreader which receives the real component of the complex early/late signal and the late delayed local pseudo-noise sequence signal and outputs a fifth despread signal;

a fifth accumulate and dump filter which receives the fifth despread signal and outputs a real (I) component of the complex late timing error signal;

a sixth despreader which receives the imaginary component of the complex early/late signal and the late delayed pseudo-noise sequence signal and outputs a sixth despread signal; and a sixth accumulate and dump filter which receives the sixth despread signal and outputs an imaginary (Q) component of the complex late timing error signal.

8. The apparatus as recited in claim 7 wherein:

(a) the first despreader comprises a first plurality of Exclusive-OR gates connected in parallel which each receive the local pseudo-noise sequence signal and the real component of the complex early/late signal;

(b) the first accumulate and dump filter comprises a first accumulator which receives an output from the first plurality of Exclusive-OR gates and outputs a first accumulated value; and an early I output latch which latches and outputs the first accumulated value;

(c) the second despreader comprises a second plurality of Exclusive-OR gates connected in parallel each of which receives a second delayed local pseudo-noise sequence signal and the imaginary component of the complex early/late signal;

(d) the second accumulate and dump filter comprises a second accumulator which receives an output from the second plurality of Exclusive-OR gates and outputs a second accumulated value; and an early Q output latch which latches and outputs the second accumulated value.

9. A method of digitally downconverting and despreading an analog direct sequence spread spectrum signal, comprising the steps of:

generating a free-running, non-steered, A/D sample clock; the A/D sample clock having a rate which is an integral multiple of a chip rate of the spread spectrum signal;

converting the spread spectrum signal into a digitized signal using the A/D sample clock and outputting a digitized signal;

generating a local pseudo-noise sequence signal; and simultaneously downconverting to baseband and filtering the digitized signal with a polyphase filter, correcting timing phase misalignment between the digitized signal and the locally generated pseudo-noise sequence signal and outputting a complex corrected baseband signal.

10. A method of digitally downconverting and despreading an analog direct sequence spread spectrum signal as recited in claim 9 wherein, an impulse response of the polyphase filter is matched to a pulse shape of the spread spectrum signal.

11. A method of digitally downconverting and despreading an analog direct sequence spread spectrum signal, comprising the steps of:

generating a free-running, non-steered, A/D sample clock;

the A/D sample clock having a rate which is an integral multiple of a chip rate of the spread spectrum signal;

converting the spread spectrum signal into a digitized signal using the A/D sample clock and outputting a digitized signal;

generating a local pseudo-noise sequence signal;

simultaneously downconverting to baseband and filtering the digitized signal with a polyphase filter, correcting timing phase misalignment between the digitized signal and the locally generate pseudo-noise sequence signal and outputting a complex corrected baseband signal;

separating the complex corrected baseband signal into a complex punctual signal and a complex early/late signal;

outputting the complex punctual and early/late signals;

the complex punctual signal consisting of samples of the complex corrected baseband signal detected at chip detection points; and the complex early/late signal consisting of samples of the complex corrected baseband signal detected at chip transition points;

despreading and accumulating the complex early/late signal using the locally generated pseudo-noise sequence signal and outputting a complex early timing error signal;

delaying the locally generated pseudo-noise sequence signal, despreading and accumulating the complex punctual signal using the delayed locally generated pseudo-noise sequence signal, and outputting a complex data symbol;

further delaying the locally generated pseudo-noise sequence signal, relative to the delayed locally generated pseudo-noise sequence signal, despreading and accumulating the complex early/late signal using the further delayed locally generated pseudo-noise sequence signal and outputting a complex late timing error signal; and performing coherent carrier frequency and phase tracking and MPSK demodulation on said complex data symbol and outputting a demodulated data bit, sample timing phase control signal and filter coefficient values.

12. A method of digitally downconverting and despreading an analog direct sequence spread spectrum signal as recited in claim 11 wherein, an impulse response of the polyphase filter is matched to a pulse shape of the spread spectrum signal.

13. An apparatus for digitally downconverting and despreading an analog direct sequence spread spectrum signal, comprising:

a clock generating means for generating and outputting a free-running, non-steered, A/D sample clock;

the A/D sample clock having a rate which is an integral multiple of a chip rate of the spread spectrum signal;

an A/D converting means for receiving the spread spectrum signal and the A/D sample clock and outputting a digitized signal from the spread spectrum signal;

a local pseudo-noise sequence signal generating means for generating and outputting a local pseudo-noise sequence signal;

a complex downconverter/polyphase filtering means for receiving the digitized signal and the A/D sample clock and a sample timing phase control signal, simultaneously filtering and downconverting the digitized signal to baseband, correcting timing phase misalignment between the digitized signal and the locally generated pseudo-noise sequence signal, and outputting a complex corrected baseband signal;

wherein an impulse response of the downconverter/polyphase filter is matched to a pulse shape of the spread spectrum signal;

a demultiplexing means for receiving the complex corrected baseband signal from the complex downconverter/polyphase filter and separating the complex corrected baseband signal into a complex punctual signal and a complex early/late signal and outputting the complex punctual and early/late signals;
wherein the complex punctual signal consists of samples of the complex corrected baseband signal detected at chip detection points; and
the complex early/late signal consists of samples of the complex corrected baseband signal detected at chip transition points;

an early channel processing means for receiving the complex early/late signal, despreading and accumulating the complex early/late signal using the locally generated pseudo-noise sequence signal and outputting a complex early timing error signal;

a punctual channel processing means for receiving the complex punctual signal, delaying the locally generated pseudo-noise sequence signal, despreading and accumulating the complex punctual signal using the delayed locally generated pseudo-noise sequence signal, and outputting a complex data symbol;

a late channel processing means for receiving the complex early/late signal, further delaying the locally generated pseudo-noise sequence signal, relative to the delayed locally generated pseudo-noise sequence signal, despreading and accumulating the complex early/late signal using the further delayed locally generated pseudo-noise sequence signal and outputting a complex late timing error signal; and a digital signal processing means for receiving the complex early timing error signal, the complex data symbol and the complex late timing error signal and performing coherent carrier frequency and phase tracking and MPSK demodulation on a complex data symbol and outputting a demodulated data bit, sample timing phase control signal and filter coefficient values.

\* \* \* \* \*